US008745748B2

(12) United States Patent
Ifrim et al.

(10) Patent No.: US 8,745,748 B2
(45) Date of Patent: Jun. 3, 2014

(54) CANCELLING DIGITAL SIGNATURES FOR FORM FILES

(75) Inventors: Silviu Ifrim, Sammamish, WA (US); Paramita Das, Bellevue, WA (US); Christopher A. Brotsos, Kirkland, WA (US); Paul Michael Schofield, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 12/905,956

(22) Filed: Oct. 15, 2010

(65) Prior Publication Data
US 2012/0096559 A1 Apr. 19, 2012

(51) Int. Cl.
G06F 7/00 (2006.01)

(52) U.S. Cl.
USPC ............. 726/26; 709/203; 709/224; 717/140; 726/10; 726/27; 726/28; 713/156; 705/34; 705/51; 705/63

(58) Field of Classification Search
USPC ........... 726/26, 10, 27, 28; 713/156; 717/140; 709/203, 224; 705/51, 63, 34
See application file for complete search history.

(56) References Cited

U.S. PATENT DOCUMENTS

| 6,658,421 | B1 * | 12/2003 | Seshadri ........................ 717/140 |
| 7,076,652 | B2 | 7/2006 | Ginter et al. |
| 7,167,844 | B1 | 1/2007 | Leong et al. |
| 2003/0097581 | A1 * | 5/2003 | Zimmer ........................ 713/200 |
| 2003/0135380 | A1 * | 7/2003 | Lehr et al. ........................ 705/1 |
| 2005/0021474 | A1 * | 1/2005 | Geist et al. ...................... 705/63 |
| 2005/0076215 | A1 * | 4/2005 | Dryer ............................. 713/170 |
| 2005/0229258 | A1 * | 10/2005 | Pigin ............................... 726/27 |
| 2006/0036619 | A1 * | 2/2006 | Fuerst et al. .................. 707/100 |
| 2007/0005978 | A1 * | 1/2007 | O'Connor et al. ............ 713/176 |

(Continued)

OTHER PUBLICATIONS

Anderson, Steve et al., "Web Services Secure Conversation Language (WS-SecureConversation)" Feb. 2005, Retrieved from: <http://specs.xmlsoap.org/ws/2005/02/sc/WS-SecureConversation.pdf>, (31 pages).

(Continued)

Primary Examiner — Beemnet Dada
Assistant Examiner — Sayed Beheshti Shirazi
(74) Attorney, Agent, or Firm — Tom Wong; Peter Taylor; Micky Minhas

(57) ABSTRACT

The embodiments described herein generally relate to methods and systems for enabling a client to request a server to cancel the digital signing of a form file associated with a form. Successful cancellation of the digital signing process results in a return of the form file to its initial state, in which data are not lost, and the form can be resubmitted and/or the application of the digital signature can be retried. Request and response messages, communicated between a protocol client and a protocol server, cause the performance of protocol functions for applying a digital signature to a form file and for cancelling the signature thereof where errors in the signing process are detected. A versioning mechanism enabling the detection of version differences and resulting upgrades to the digital signature control allows for robust communications between a client and a server operating under different product versions.

16 Claims, 16 Drawing Sheets

(56) References Cited

U.S. PATENT DOCUMENTS

| | | | |
|---|---|---|---|
| 2007/0118491 A1* | 5/2007 | Baum et al. | 706/20 |
| 2007/0168658 A1* | 7/2007 | Yamauchi | 713/156 |
| 2007/0185814 A1* | 8/2007 | Boccon-Gibod et al. | 705/51 |
| 2008/0040496 A1* | 2/2008 | Zhao et al. | 709/230 |
| 2008/0072334 A1* | 3/2008 | Bailey et al. | 726/28 |
| 2008/0195708 A1* | 8/2008 | Kirkland et al. | 709/206 |
| 2008/0301815 A1* | 12/2008 | Lauter et al. | 726/26 |
| 2009/0138517 A1* | 5/2009 | McLain et al. | 707/104.1 |
| 2009/0287835 A1 | 11/2009 | Jacobson | |
| 2010/0017223 A1* | 1/2010 | Johnson et al. | 705/2 |
| 2011/0080618 A1* | 4/2011 | Viswanathan et al. | 358/3.28 |
| 2011/0295936 A1* | 12/2011 | Gill et al. | 709/203 |
| 2012/0030341 A1* | 2/2012 | Jensen et al. | 709/224 |

OTHER PUBLICATIONS

Cameron, Stefan, "Building intelligent forms using Adobe LiveCycle Designer," Oct. 2008, Retrieved from: <http://forms.stefcameron.com/category/bugs/>, (9 pages).

Orchard, David, et al. "Versioning XML Languages," Oct. 2003, Retrieved from: <http://www.w3.org/2001/tag/doc/versioning-20031003.html>, (27 pages).

Templeton, Brad, "How to authenticate cancel messages today," [Retrieved on May 7, 2010], Retrieved from: <http://www.netfunny.com/usenet-format/cancel.html>, (4 pages).

Tobarra, Llanos, et al. "Analysis of Web Services Secure Conversation with Formal Methods," 2007, Retrieved from: <http://ieeexplore.ieee.org/stamp/stamp.jsp?tp=&arnumber=4222929>, (6 pages).

* cited by examiner

CANCELLING DIGITAL SIGNATURES FOR FORM FILES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright.COPYRGT. 2010, Microsoft Corp.

BACKGROUND

The use of the Internet for the access and completion of electronic forms, such as Web browser forms, has become increasingly prevalent and useful. For example, forms are used both to support business processes internal to companies and to provide an easy way for users of the Internet to provide information to another entity for completion of a desired transaction. In completing forms for financial transactions, software distribution, and any forms requiring confidential and/or secure information and data, for example, it is common to use a digital signature to authenticate the form. Digital signatures are electronic security marks that allow for verification of the source of the particular file and verification that the file has not been tampered with since it was digitally signed. Digital signatures thus provide assurances, including authenticity of the signer of the digital information, integrity of the content (i.e., the content of the document has not been modified since the digital signature was applied), and the ability to prove the origin of the signed content to prevent denial of association with the signed content by the signing party.

While there are numerous benefits associated with applying a digital signature to a form file of a form, in which a form file, such as an XML file, contains data entered into a form, problems can occur in the process of applying a digital signature to a form file. Such problems can cause failure of the signing process and/or corruption of the form file of a form, for example.

In applying a digital signature to a form file, form applications running on a client and a server may be used. However, it may be difficult, if not impossible, to apply a digital signature to a form file where the version of the form application running on the client is different from the version of the form application used by the server. Such problem is exacerbated by the numerous versions and version upgrades of form applications available on the market and the multiple actors involved in determining whether to purchase and/or apply such version upgrades on the client versus server ends.

Although specific problems have been addressed in this Background, this disclosure is not intended in any way to be limited to solving those specific problems.

SUMMARY

Embodiments generally relate to enabling a client to request to cancel the application of a digital signature to a form file, such as an XML file, associated with a form. Cancelling the application of a digital signature avoids the corruption of the form file, for example, which can occur when the signing process fails. In embodiments, a client requests to apply a digital signature to a form file. The form file, in embodiments, is stored on a server. During the signing session, errors may occur. Instead of having such errors cause the form file to enter a corrupted state, in which data entered into the form associated with the form file are lost, embodiments of the present disclosure provide for cancellation of the application of the application of the digital signature to the form file. With a successful cancellation of the digital signature, the form file is returned to its initial state and data used to populate the form, such as data entered by a user, is not lost. In such embodiments, a user is able to retry applying a digital signature to the form file, or simply resubmitting the form in other embodiments, without having to reenter the data. The ability to cancel the application of the digital signature to prevent the loss of data when errors occur thus results in savings of time and the promotion of accuracy given that a user, for example, will not need to try to remember the data previously entered into the form fields for the reentry thereof.

Embodiments of the present disclosure provide for the digital signing of a form file to occur through the interactions of a protocol client and a protocol server. An example protocol client, according to embodiments, uses MICROSOFT SHAREPOINT DIGITAL SIGNATURE CONTROL FOR FORMS SERVICES produced by MICROSOFT CORPORATION of Redmond, Wash. Further, an example protocol server, according to embodiments, is provided by MICROSOFT INFOPATH FORMS SERVICES produced by MICROSOFT CORPORATION of Redmond, Wash. The form, in embodiments, may thus be an InfoPath form provided by MICROSOFT INFOPATH FORMS SERVICES. Request and response messages are transmitted between the protocol client and protocol server to apply a digital signature to a form file and to cancel the digital signature in situations where error codes are received by the protocol client from the protocol server, for example.

Further embodiments provide for the ability of a protocol client to compensate for differences in product versions, such as when a protocol client operates with a product version that is different from the version used by the protocol server with which the protocol client is in communication. For example, an embodiment provides for a protocol client using MICROSOFT SHAREPOINT DIGITAL SIGNATURE CONTROL FOR FORMS SERVICES 2010 to make any necessary changes to communicate with a protocol server operating with MICROSOFT INFOPATH FORMS SERVICES 2007. In embodiments, for example, a protocol client operating under MICROSOFT SHAREPOINT DIGITAL SIGNATURE CONTROL FOR FORMS SERVICES 2010 can effectuate digital signing for a form file stored by a protocol server operating under MICROSOFT INFOPATH FORMS SERVICES 2007. In other example embodiments, a protocol client operating under MICROSOFT SHAREPOINT DIGITAL SIGNATURE CONTROL FOR FORMS SERVICES 2007 can effectuate digital signing for a form file stored by a protocol server operating under MICROSOFT INFOPATH FORMS SERVICES 2010. Such versioning capabilities thus result in a robust mechanism for upgrading the digital signature control, for example. "MICROSOFT INFOPATH FORMS SERVICES" and "MICROSOFT SHAREPOINT DIGITAL SIGNATURE CONTROL FOR FORMS SERVICES" and the above-mentioned product versions are offered by way of example only to illustrate the versioning capabilities of embodiments disclosed herein.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

FIG. 5A illustrates a flow diagram illustrating the operational characteristics of a process for applying, through a protocol client and a protocol server, a digital signature to a form file, including adding a signature element to the form file, in which FIG. 5A depicts operations on the protocol server, in accordance with embodiments of the present disclosure.

FIG. 5B depicts a flow diagram illustrating the operational characteristics of a process for applying, through a protocol client and a protocol server, a digital signature to a form file, including moving the form file to a pre-signed state, in which FIG. 5B illustrates operations on the protocol server, in accordance with embodiments of the present disclosure.

FIG. 5C illustrates a flow diagram illustrating the operational characteristics of a process for applying, through a protocol client and a protocol server, a digital signature to a form file, including determining if the state of an EventLog is different from the PageStateData in a response, in which FIG. 5C depicts operations on the protocol server in accordance with embodiments of the present disclosure.

FIG. 5D depicts a flow diagram illustrating the operational characteristics of a process for applying, through a protocol client and a protocol server, a digital signature to a form file, including moving the form file to a signed complete state, in which FIG. 5D illustrates operations on the protocol server in accordance with embodiments of the present disclosure.

DETAILED DESCRIPTION

Figure 1:
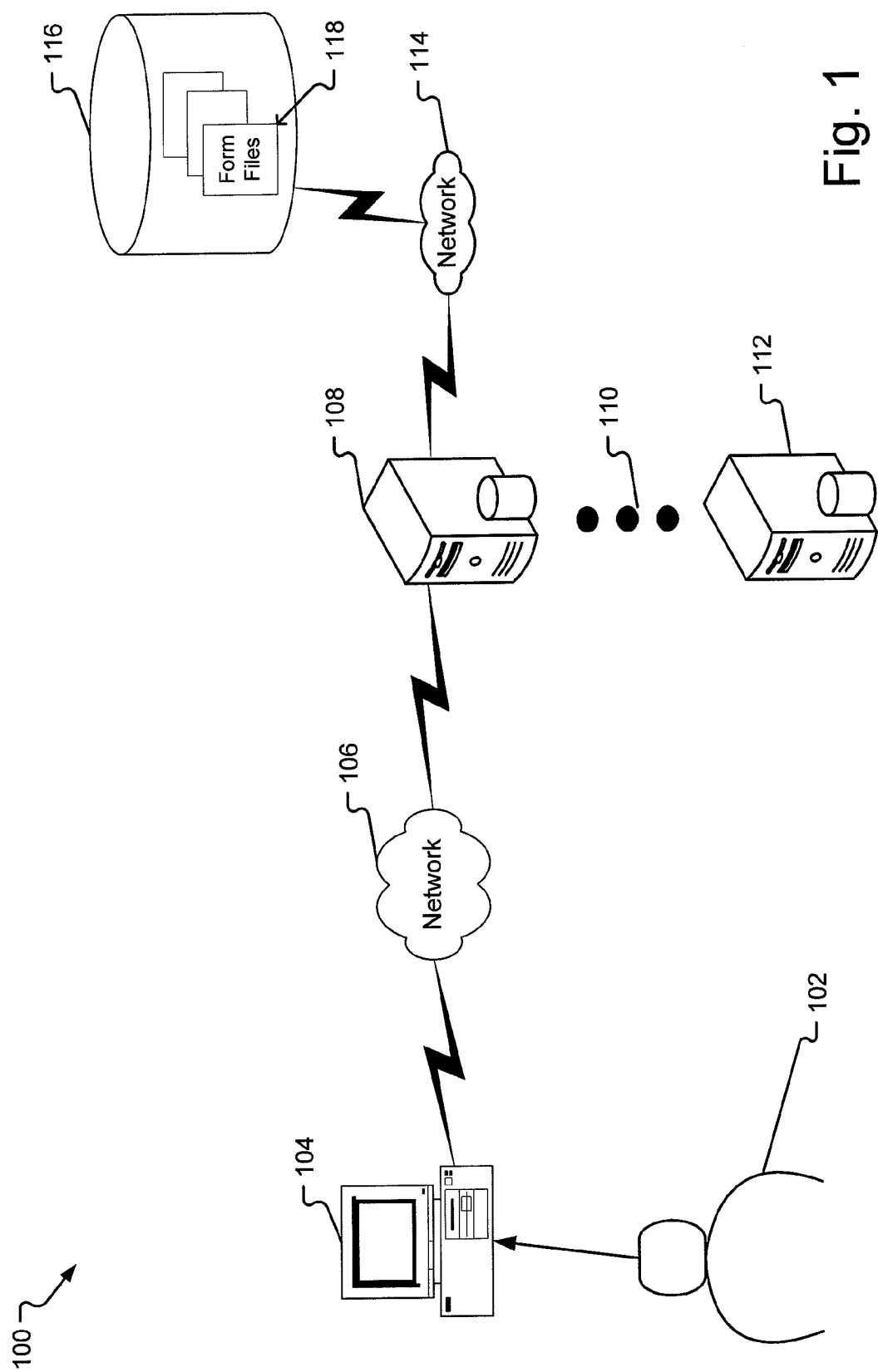
FIG. 1 illustrates an example logical representation of an environment or system for applying and/or cancelling the application of a digital signature to a form file stored on a protocol server in accordance with embodiments of the present disclosure.

This disclosure will now more fully describe example embodiments with reference to the accompanying drawings, in which specific embodiments are shown. Other aspects may, however, be embodied in many different forms, and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to enabling a client to request to cancel a digital signing process of a form file. Such form file may be associated with a form or form template, according to embodiments, and is stored on a protocol server. According to an embodiment, the protocol server is provided by MICROSOFT INFOPATH FORMS SERVICES produced by MICROSOFT CORPORATION of Redmond, Wash., for example.

To initiate a digital signing process of a form file associated with a form, a protocol client sends a message to the protocol server to initiate the application of a digital signature to the applicable form file. In an embodiment, the protocol client and protocol server communicate over a Hypertext Transfer Protocol (HTTP) connection. The protocol server maintains a mapping between client data and the associated form file stored on the protocol server, according to embodiments. In embodiments, this mapping is stored as part of an Event Log, or EventLog, in which the EventLog comprises protocol server specific information specified by a string of values separated by semicolons. The EventLog, in embodiments, comprises a header, entry, and state, as discussed further below. The request by a protocol client to initiate the creation and addition of a digital signature to a form file maintained by a protocol server comprises local information, including a rendered image of the form file and operating system information to be embedded in the signed form file. The request, in embodiments, includes an EventLog, in addition to other specific elements. In an embodiment, this request to initiate the application of a digital signature is referred to as a Retrieve Form File Hash request. In response, the protocol server sends an HTTP response to the protocol client comprising a digest of the local information and other data stored in the form file. In embodiments, this response is referred to as a Retrieve Form File Hash response.

Next, the protocol client generates encrypted ciphertext of a digest value received from the protocol server. The ciphertext value and certificate used to encrypt it are sent to the protocol server and stored in the form file as value and context, respectively, of the digital signature. In embodiments, the message sending the ciphertext value and certificate is referred to as an Add Signature Value and Context message. This message comprises an EventLog, in addition to other specific elements, according to embodiments. The digital signature process is complete when the protocol server is successful in processing this request from the protocol client.

During this signing session, the protocol server thus modifies an applicable form file using data sent by the protocol client. In embodiments, the form file transitions between three different states during the signing session. These three states include: (1) Initial State: the state of the form file before the start of a signing session; (2) Pre-Signed State: the state of the form file after successfully processing a Retrieve Form File Hash message; and (3) Signed Complete State: the state of the form file after successfully processing an Add Signature Value and Context message. In embodiments, the Signed Complete State is equivalent to the Initial State. According to embodiments, the digital signature applied during the signing session conforms to a property structure defined for such signature. For example, a digital signature property structure is described in the InfoPath Form File Format Specification [MS-IPFFX] by MICROSOFT CORPORATION of Redmond, Wash. The InfoPath Form File Format Specification is hereby incorporated by reference in its entirety for all that it teaches and discloses. The file format for InfoPath form templates is described in the InfoPath Form Template Format Specification [MS-IPFF] by MICROSOFT CORPORATION, for example. The InfoPath Form Template Format Specification is hereby incorporated by reference in its entirety for all that it teaches and discloses. The file format for InfoPath form templates is described in the InfoPath Form Template Format Version 2 Specification [MS-IPFF2] by MICROSOFT CORPORATION, for example. The InfoPath Form Template Format Version 2 Specification is hereby incorporated by reference in its entirety for all that it teaches and discloses.

In embodiments, where errors are detected in the digital signing process, the client sends a request, such as an HTTP request, to the protocol server to cancel the signing process. In embodiments, this cancel request comprises an EventLog to provide information to the server specifying protocol server specific information for acting on the request. To provide such information, EventLog parsing occurs, in which the client extracts data and, from the extracted data, identifies data with a certain structure to send with the request to cancel a digital signature, for example. With the cancel digital signature function, the protocol server is thus notified that the signing process has been cancelled and is provided with specific information for acting on the request from the protocol client. After a successful cancellation process, the form file is returned to the Initial State. By returning the form file to its Initial State, the fields of the associated form, for example, remain populated with data previously entered. The form is thus prevented from entering a corrupt state with loss of data and, instead, may be resubmitted and/or retried for application of the digital signature and submission.

In accordance with embodiments, digital signing and cancelling of the digital signature is enabled by providing application programming interfaces (APIs) on the protocol client and the protocol server hosting the form application. The APIs process request messages and response messages, such as messages for Retrieve Form File Hash, Add Signature Value and Context, and Cancel Digital Signature. In embodiments, the APIs process request messages to put such messages in the proper format, structure, and syntax for calling the functionality of the application. Such format, structure, and syntax are governed by a protocol, such as specified in the InfoPath Digital Signing Protocol Specification [MS-IPDSP], provided by MICROSOFT CORPORATION of Redmond, Wash., according to embodiments disclosed herein. Specific methods and message processing events are thus defined in accordance with the InfoPath Digital Signing Protocol, for example, for conducting a signing session, cancelling a digital signature process, and/or otherwise generally handling communications between a protocol client and a protocol server. The InfoPath Digital Signing Protocol is offered for example purposes as a type of protocol to be used in accordance with embodiments disclosed herein. The InfoPath Digital Signing Protocol Specification is hereby incorporated by reference in its entirety for all that it teaches and discloses.

Further embodiments provide for a versioning mechanism to allow for communications between a protocol client and protocol server operating under different product versions. A protocol client receives an indication from the protocol server of the version of the form application being used by the protocol server. The protocol client then compares the received version indication to the version implemented by the protocol client. If there is a difference in versions, the protocol client makes adjustments to its message requests, syntax, structure, etc. to compensate for any such differences, according to embodiments. Multiple versions of the protocol server are thus enabled to interoperate with the latest version of the protocol client. Consequently, the latest, or most recent, protocol client version can apply a digital signature to a document stored on previous version releases of the protocol server. Such versioning mechanism provides for robust communications and compatibility between protocol clients and protocol servers regardless of product versions used.

An example logical environment or system for applying and/or cancelling the application of a digital signature to a form file stored on a protocol server is shown in logical environment 100 of FIG. 1 in accordance with embodiments disclosed herein. A client computer 104, or protocol client 104, renders data of an electronic document, such as a form or file template (hereinafter, "form") according to embodiments, for receipt of data entered by user 102. While user 102 thus provides data according to an embodiment disclosed herein, it is to be understood that user 102 refers to multiple users in other embodiments. For example, users can sign other users' data. User 102 may thus refer to a user providing data, a user signing the data, and/or any user involved in the form lifecycle, according to embodiments of the present disclosure. In yet further embodiments, no user 102 is directly involved but, instead, client computer 104 receives data from another client computer and/or server, for example.

The form is rendered using view information with a Web browser, in accordance with embodiments. In other embodiments, the form is rendered with a naked network browser, such as a browser with no plug-ins, ActiveX controls, etc. Any type of browser or client computer allowing the running of a protocol client implementation as known to those of ordinary skill in the art can be used in accordance with embodiments disclosed herein. The form is received over network 106 from server 108, or protocol server 108, in response to a request for such form from client computer 104. In embodiments, any number of servers 108, 110, and 112 can be used, as shown by ellipses 110. In turn, server 108 retrieves the requested form file 118 associated with the form from database 116 over network 114.

Logical environment 100 is not limited to any particular implementation and instead embodies any computing environment upon which the functionality of the environment described herein may be practiced. Further, networks 106 and 114, although shown as individual single networks may be any types of networks conventionally understood by those of ordinary skill in the art. In accordance with an example embodiment, the network may be the global network (e.g., the Internet or World Wide Web, i.e., "Web" for short). It may also be a local area network, e.g., intranet, or a wide area network. In accordance with embodiments, communications over networks 106 and 114 occur according to one or more standard packet-based formats, e.g., H.323, IP, Ethernet, and/or ATM.

Further, any type of environment or system can be used in accordance with embodiments of the present disclosure. FIG. 1 is offered as an example only for purposes of understanding the teachings of the embodiments disclosed herein. For example, FIG. 1 shows servers 108, 110, and 112. However, embodiments also cover any type of server, separate servers, server farm, or other message server. Further yet, FIG. 1 shows client computer 104. However, any type of small computer device can be used without departing from the spirit and scope of the embodiments disclosed herein. Indeed, environment or system 100 represents a valid way of practicing embodiments disclosed herein but is in no way intended to limit the scope of the present disclosure. Further, the example network environment 100 may be considered in terms of the specific components described, e.g., protocol server, protocol client, etc., or, alternatively, may be considered in terms of the analogous modules corresponding to such units.

Although only one client computer 104 is shown, for example, another embodiment provides for multiple small computer devices to communicate with server 108. In an embodiment, each small computer device communicates with the network 106, or, in other embodiments, multiple and separate networks communicate with the small computer devices. In yet another embodiment, each small computer device communicates with a separate network.

Figure 2:
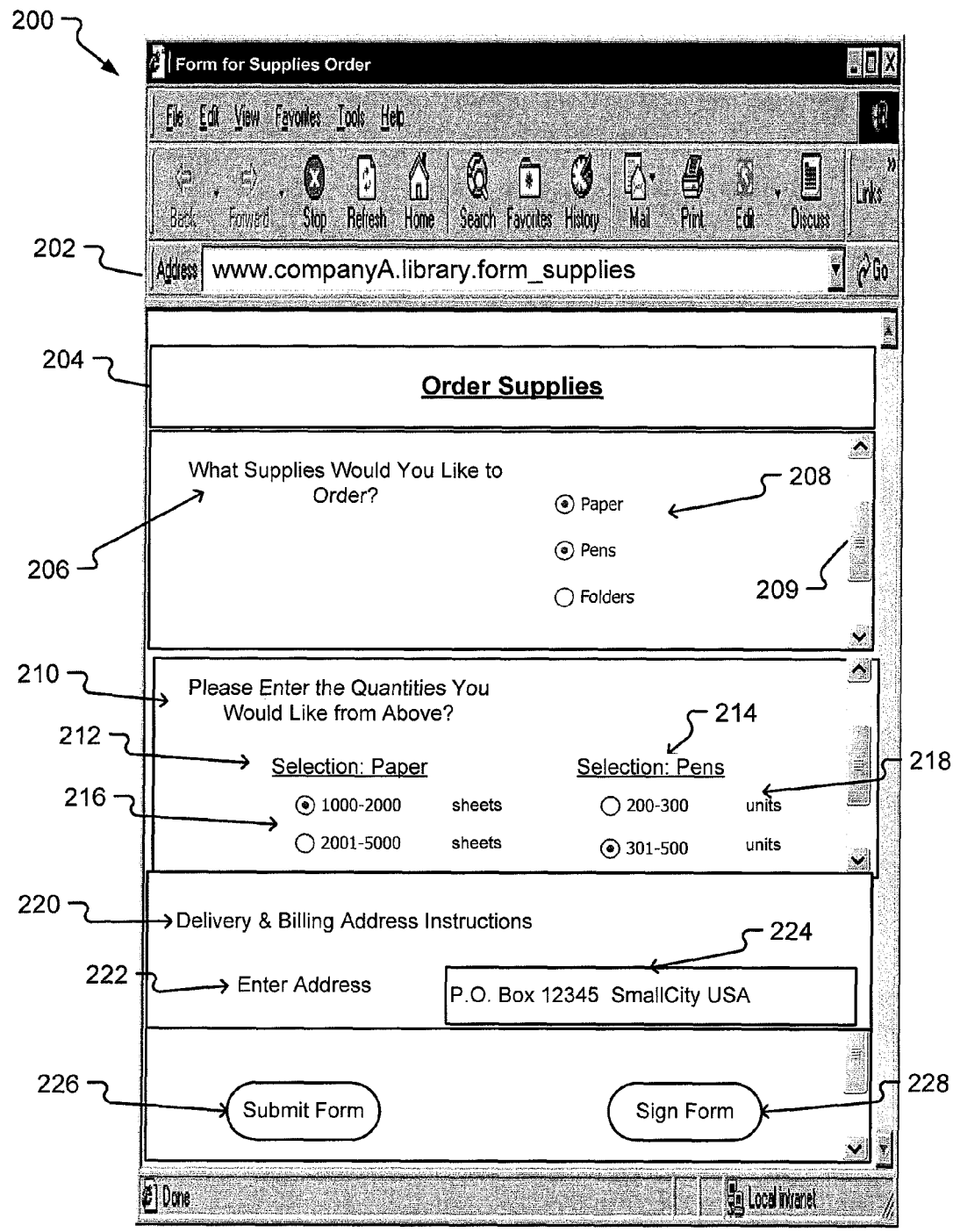
FIG. 2 depicts an example user interface (UI) of a form, as retrieved in the logical representation of the environment or system of FIG. 1, for example, with controls and spaces used for entering and displaying information, electronically signing data, and submitting data in accordance with embodiments of the present disclosure.

While FIG. 1 shows example environment or system 100 for applying and/or cancelling the application of a digital signature to a form file, FIG. 2 illustrates an example user interface (UI) 200 of a form, as retrieved in the logical representation of the environment or system of FIG. 1, for example, with controls and spaces used for entering and displaying information, submitting data, and electronically signing data in accordance with embodiments of the present disclosure. Such data may be entered, for example, through the use of a Web browser or through a client application such as MICROSOFT SHAREPOINT DIGITAL SIGNATURE CONTROL FOR FORMS SERVICES. Other types of browsers or applications may be used for entering data or otherwise modifying a form such as user interface 200. User interface 200 of a form is displayed on the user interface of client computer 104, for example. While a single user interface 200 is shown in FIG. 2, multiple user interfaces can be used in accordance with embodiments disclosed herein. User interface 200 displays example URL address 202, "www.companyA.library.form_supplies," showing the retrieval of form 200 from a library of forms located in database 116, for example, and retrieved over network 114 at companyA, for example. "Order Supplies" title 204 indicates that form 200 is a form for ordering supplies. User 102, for example, is then able to order particular supplies by entering data into form 200 and selecting from available choices. For example, user 102 is prompted as to "What Supplies Would You Like to Order?" 206 with radio buttons designating possible selections of "Paper," "Pens," "Folders" 208, etc. Other supply selections may also be available (not shown) as indicated by the ability to use scroll, or toggle, bar 209 to move up/down to reveal more information in the display. Having selected "Paper" and "Pens" 208, these selections appear at "Paper" 212" and "Pens" 214 with the ability to "Please Enter the Quantities You Would Like from Above" 210. In this example form, user 102 has selected 1000-2000 sheets of paper 216 and 301-500 units of pens 218. Next, user 102 is prompted to enter delivery and billing address instructions 220, including the desired address 222 in text box 224 of form 200. Finally, user 102 may "click" on the "Submit Form" button 226 and/or "click" on the "Sign Form" button 228 to request that a digital signature be applied to the form file associated with form 200, according to embodiments. User interface 200 is offered for purposes of illustration only. Any type of user interfaces can be used in accordance with embodiments disclosed herein. Further, the specific buttons, radio controls, text entry boxes, text, selection indicators, etc. are offered by way of example only for purposes of illustration. Any type, arrangement, and content of buttons, radio controls, text entry boxes, text, selection indicators, and/or other form features and functions may be used in accordance with embodiments disclosed herein. Further, while user interface 200 shows an indicator of "Local intranet," as consistent with the Order of Supplies from "CompanyA" in the example depicted, other embodiments provide for the use of any network, such as the Internet, including the World Wide Web ("WWW" or "Web"), for example.

Figure 3:
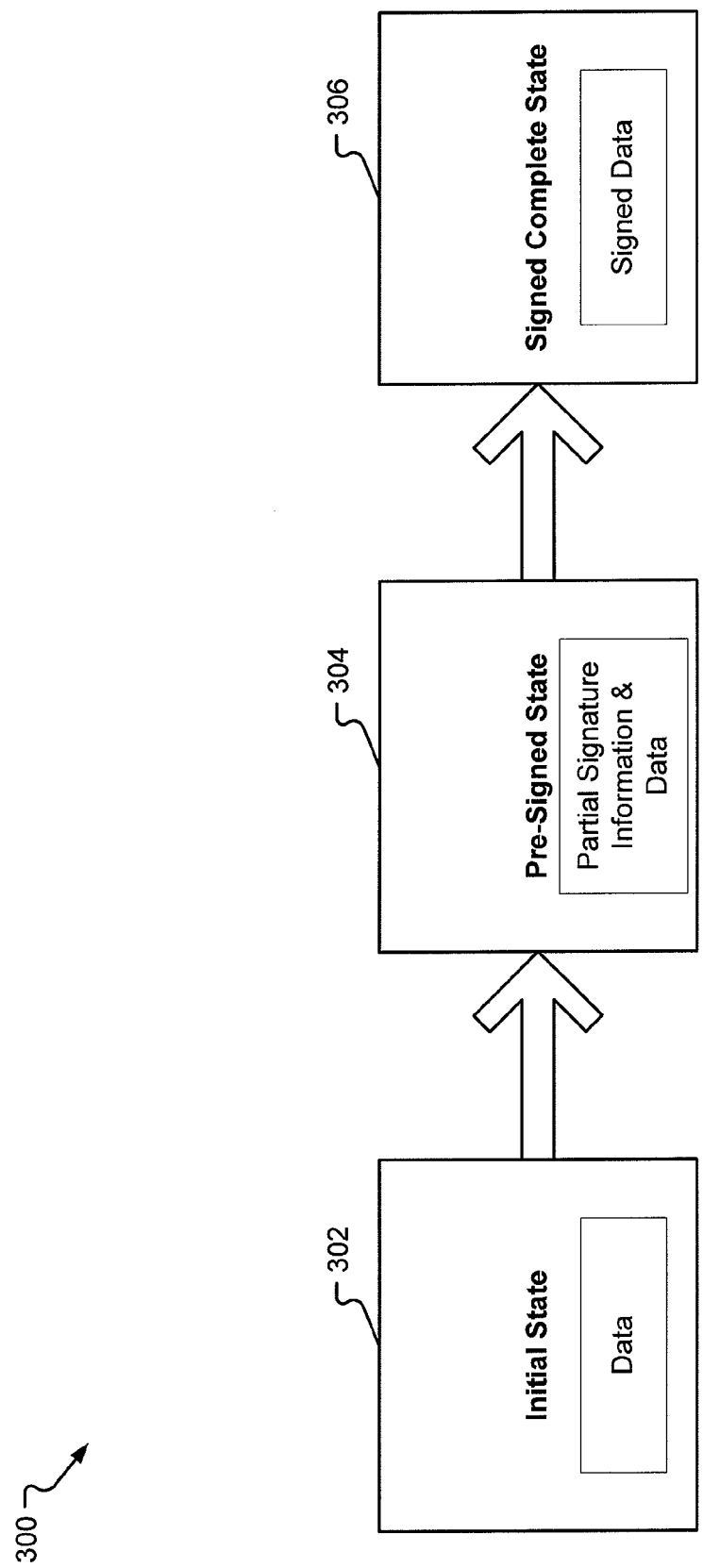
FIG. 3 illustrates an example conceptual representation or model of three states of a form file during a signing session of the form file for the form depicted in FIG. 2, for example, in accordance with embodiments of the present disclosure.

While a user may select to apply a digital signature to a form file as shown in the user interface of FIG. 2, FIG. 3 illustrates an example conceptual representation or model 300 of three states of a form file during a signing session of the form file for an associated form in accordance with embodiments disclosed herein. A protocol server receives or accepts a request from a protocol client to create and add a digital signature to a particular form file stored or maintained by the protocol server. The multi-step process involved in this process of applying a digital signature is referred to as a "signing session." The signing session contains calls for the protocol server to modify a form file using data sent by the protocol client. The calls are made by a software component, for example. The protocol server maintains a mapping between the client data and the form file stored on the protocol server. Such mapping is stored as part of the EventLog, according to embodiments. During a signing session, a form file may possess three different states in accordance with an embodiment disclosed. For example, as shown in FIG. 3, conceptual representation or model 300 depicts an Initial State 302, representing the state of the form file before the start of a signing session. As shown in FIG. 3, Initial State 302 comprises some data, such as the data entered in the form by a user, for example, and, in some embodiments, metadata related to the form file template and processing thereof. From Initial State 302, the form file moves to Pre-Signed State 304, in which this state represents the state of the form file after the protocol server successfully processes a Retrieve Form File Hash message sent by the protocol client. Pre-Signed State 304 comprises partial signature information and some data, such as the data entered in the form by a user, metadata, etc., according to embodiments. Following the Pre-Signed State 304, the form file transitions to Signed Complete State 306, representing the state of the form file after the successful processing of an Add Signature Value and Context message by the protocol server. Signed Complete State 306 comprises signed data. In embodiments, the Signed Complete State is equivalent to the Initial State. According to some embodiments, only specific sections of the form file are signed. These sections may be specified by the user, or, in other embodiments, the form file itself dictates those sections to which a digital signature applies. In further embodiments, all sections of a form are considered as "signed" at the Signed Complete State 306. Conceptual representation or model 300 is offered for purposes of illustration only, in which other names may refer to the various states of the form file during a signing session. The specific names used in model 300 to refer to the various states of the form file are offered for example purposes only.

Figure 4:
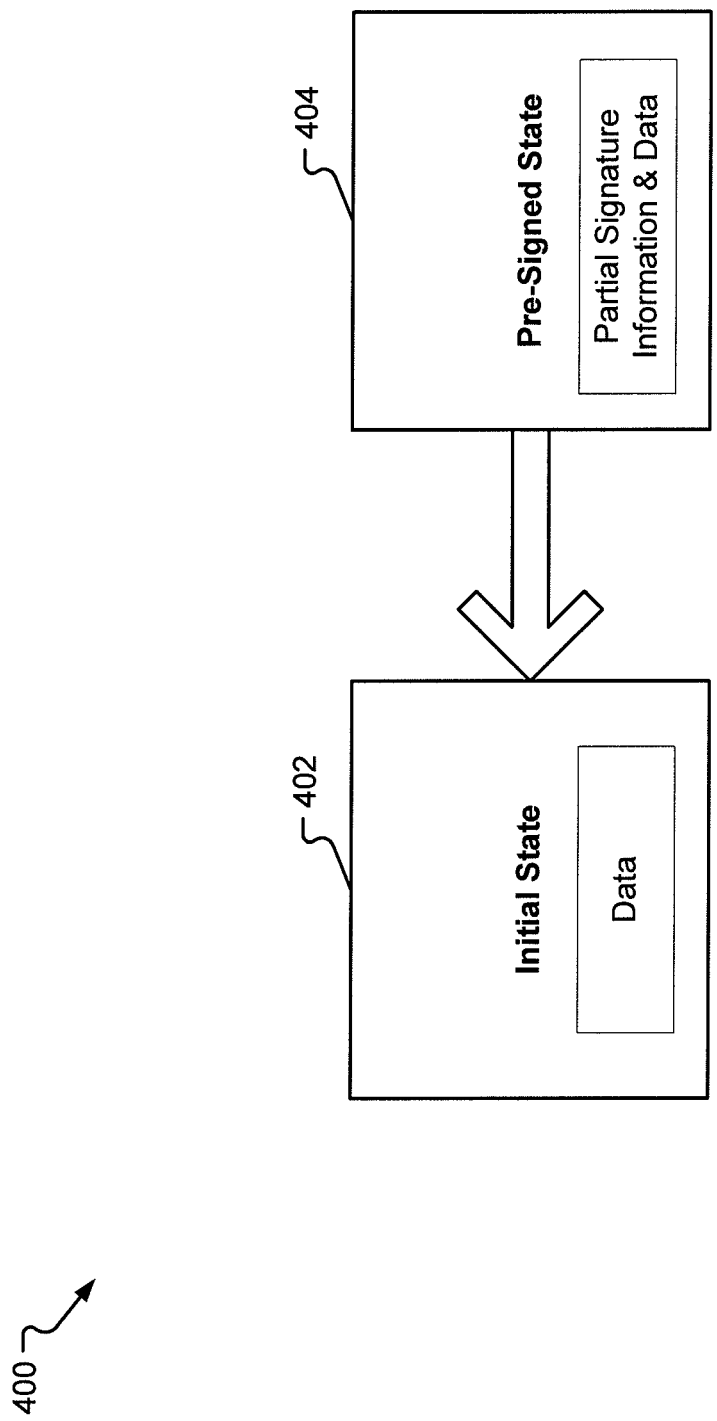
FIG. 4 depicts an example conceptual representation or model of the states of a form file following cancellation of a digital signature of a form file for the form illustrated in FIG. 2, for example, in accordance with an embodiment of the present disclosure.

While FIG. 3 depicts three example different states of a form file during a signing session, FIG. 4 illustrates conceptual representation or model 400 of example states of a form file during a digital signature cancellation process. Assuming that an error in the digital signing session occurs during the Pre-Signed State 404, a request is received from the protocol client to cancel the digital signature process. If this cancellation is successful, the protocol server restores the form file from the Pre-Signed State 404 to the Initial State 402. With the form file returned to the Initial State 402, a client is then able to resubmit the form or retry the application of a digital signature to the form without having to reenter the data populating the fields and entry boxes of the form. Conceptual representation or model 400 is offered for purposes of illustration only, in which other names may refer to the various states of the form file during a signing session. The specific names used in model 400 to refer to the various states of the form file are offered for example purposes only.

Figure 5A:
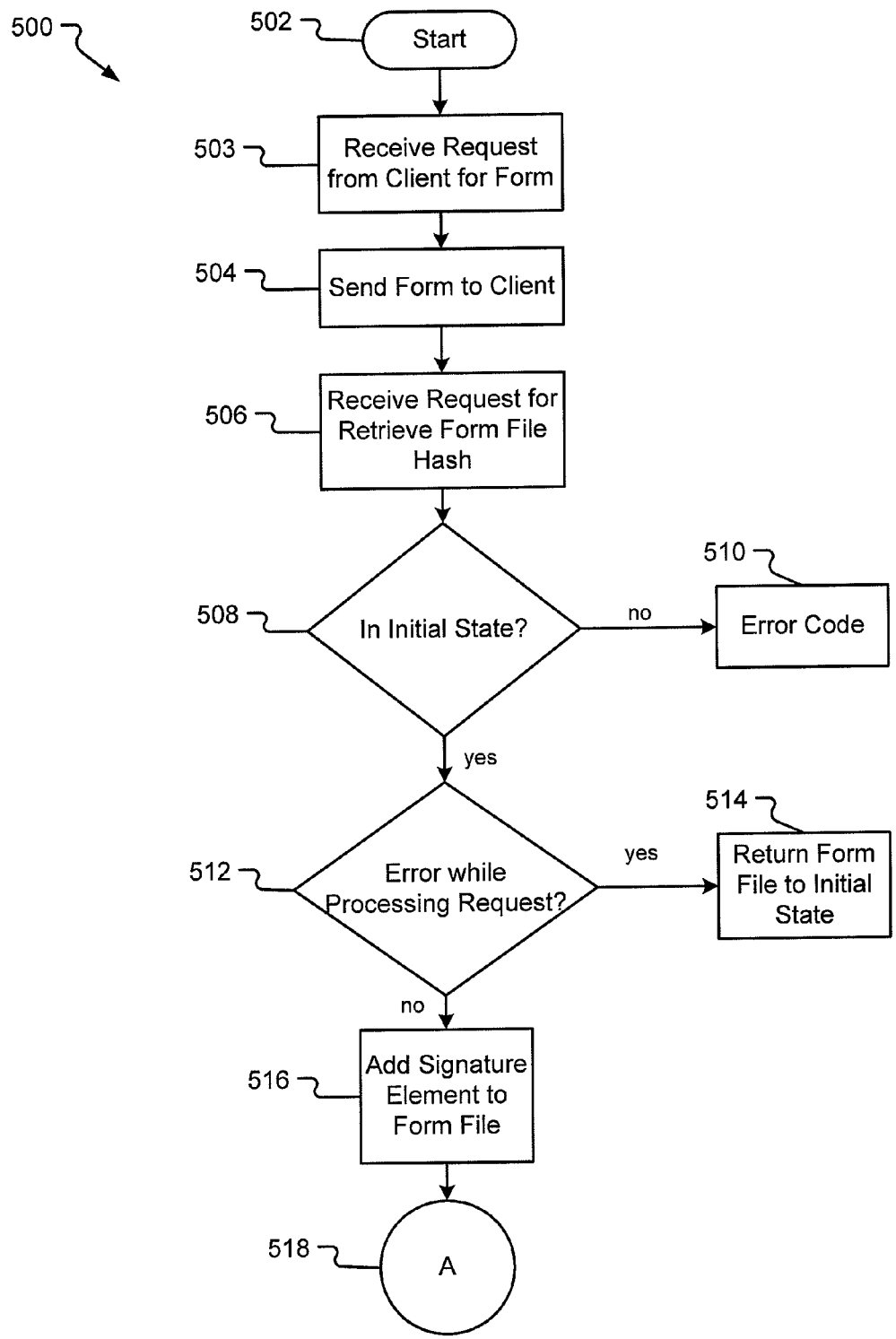

Turning to FIG. 5A, this figure depicts the operational steps 500 for applying a digital signature to a form file in accordance with embodiments of the present disclosure. For purposes of illustration, FIG. 5A shows operations on the protocol server end. START operation 502 is initiated, and process 500 proceeds to receive, by the protocol server, a request for a form 503. Protocol server then sends the form to client 504. As shown at steps 503 and 504, such form is sent to the protocol client in response to a request for such form by the protocol client. In embodiments, such request is made by entering, by a user, for example, the URL address of the form, browsing through a library of forms, for example, or otherwise indicating request and identification of the particular form desired. After entering data and populating the fields of the form, for example, the client or user selects, in embodiments, to digitally sign the form. Consequently, the protocol client sends a request to initiate the signing process, such as with a request for Retrieve Form File Hash. The protocol server thus receives the request for Retrieve Form File Hash 506 in embodiments. To process this request for Retrieve Form File Hash, the protocol server determines 508 whether the form file identified by the protocol client message is in the Initial State. If the form file is not in the Initial State, process 500 proceeds NO to error code 510, in which the protocol server stops processing the request and returns an error code 510 indicating the presence of the error. In embodiments, an error code other than "1" indicates an error causing the failure of the process. If the form file is in the Initial State, process 500 proceeds YES to query 512 for determining, by the protocol server, whether an error has occurred while processing the request. In embodiments, step 512 occurs simultaneously with step 508 for determining whether the form file is in the Initial State. In other embodiments, steps 508 and 512 are separate, as indicated in process 500. In yet other embodiments, these steps are rearranged such that step 512 occurs before step 508. If an error occurs while processing the request, process 500 proceeds YES to return form file to Initial State 514, in which the state of the form file is returned to the Initial State by the protocol server. If no error occurs in processing the request, process 500 proceeds NO to add signature element to form file 516, in which the protocol server adds a signature element to the form file identified by the protocol client message.

Figure 5B:
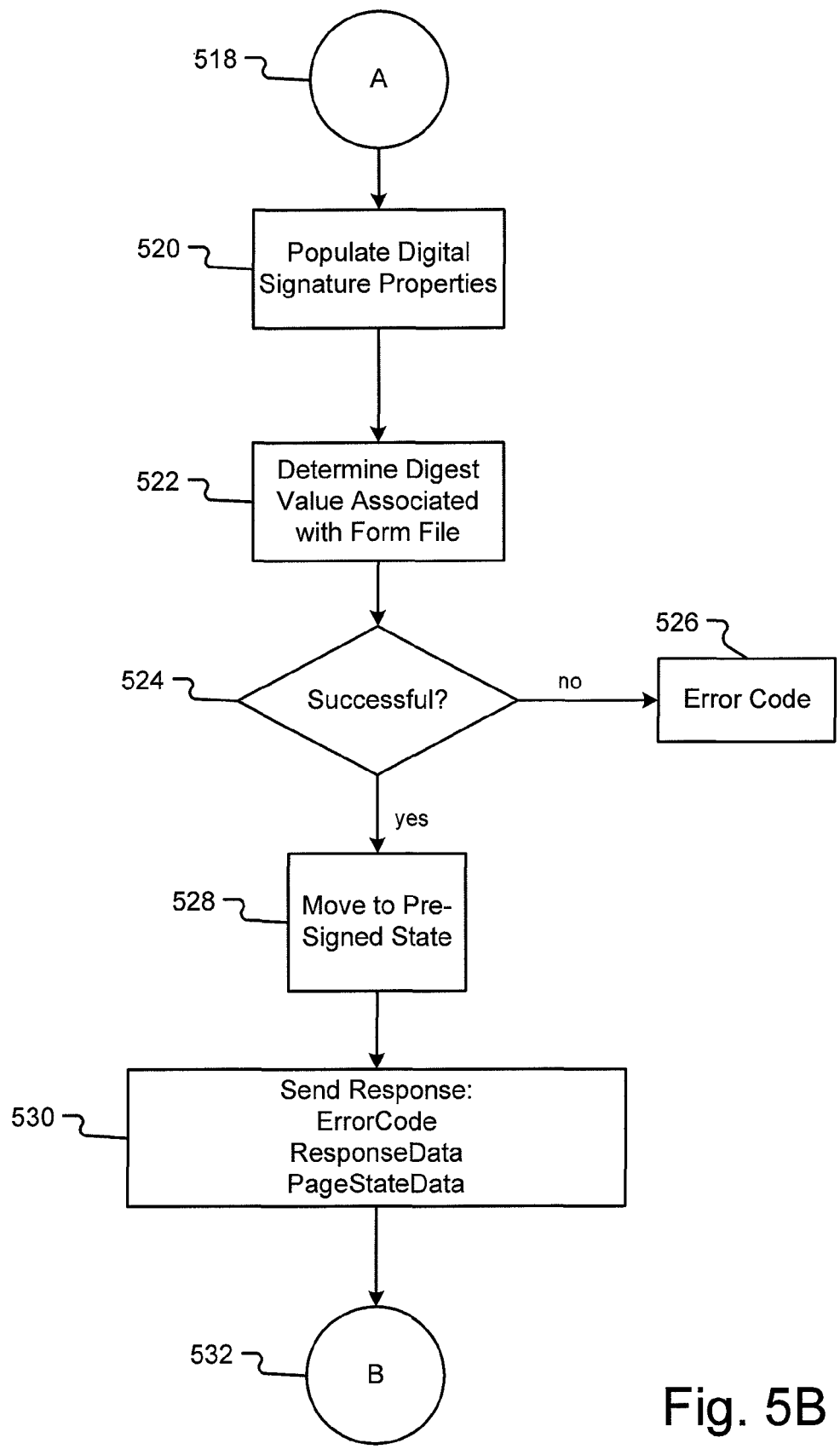

Process 500 next continues through off-page connector A 518 to populate digital signature properties operation 520 depicted in FIG. 5B, in which the protocol client uses the protocol message data to populate the digital signature properties, as specified in the Microsoft InfoPath Form File Format Specification, for example. Next, the protocol server determines 522 the digest value associated with the form file by applying processing rules for such form file. Query 524 next determines whether operations 516, 520, and 522, for example, are successfully completed. If the operations are not successful, process 500 proceeds NO to error code 526, in which an error code indicating failure of the signing process is indicated. If query operation 524 determines that the operations are successful, process 500 proceeds YES to move the state of the form file to the Pre-Signed State 528. The protocol server also sends 530 a Retrieve Form File Hash response, in which such response includes, in embodiments, an Error-Code, ResponseData, and PageStateData. The ErrorCode may indicate failure or success of the request through the use of a value indicating such. Where the process is successful, ResponseData, in turn, represents the digest value associated with the form file. The ResponseData is empty if the Error-Code indicates a failure. In embodiments, the PageStateData comprises a set of properties of protocol server implementation specific data where the protocol server maintains such properties. If the protocol server does not maintain such properties, the value for PageStateData is empty.

Figure 5C:
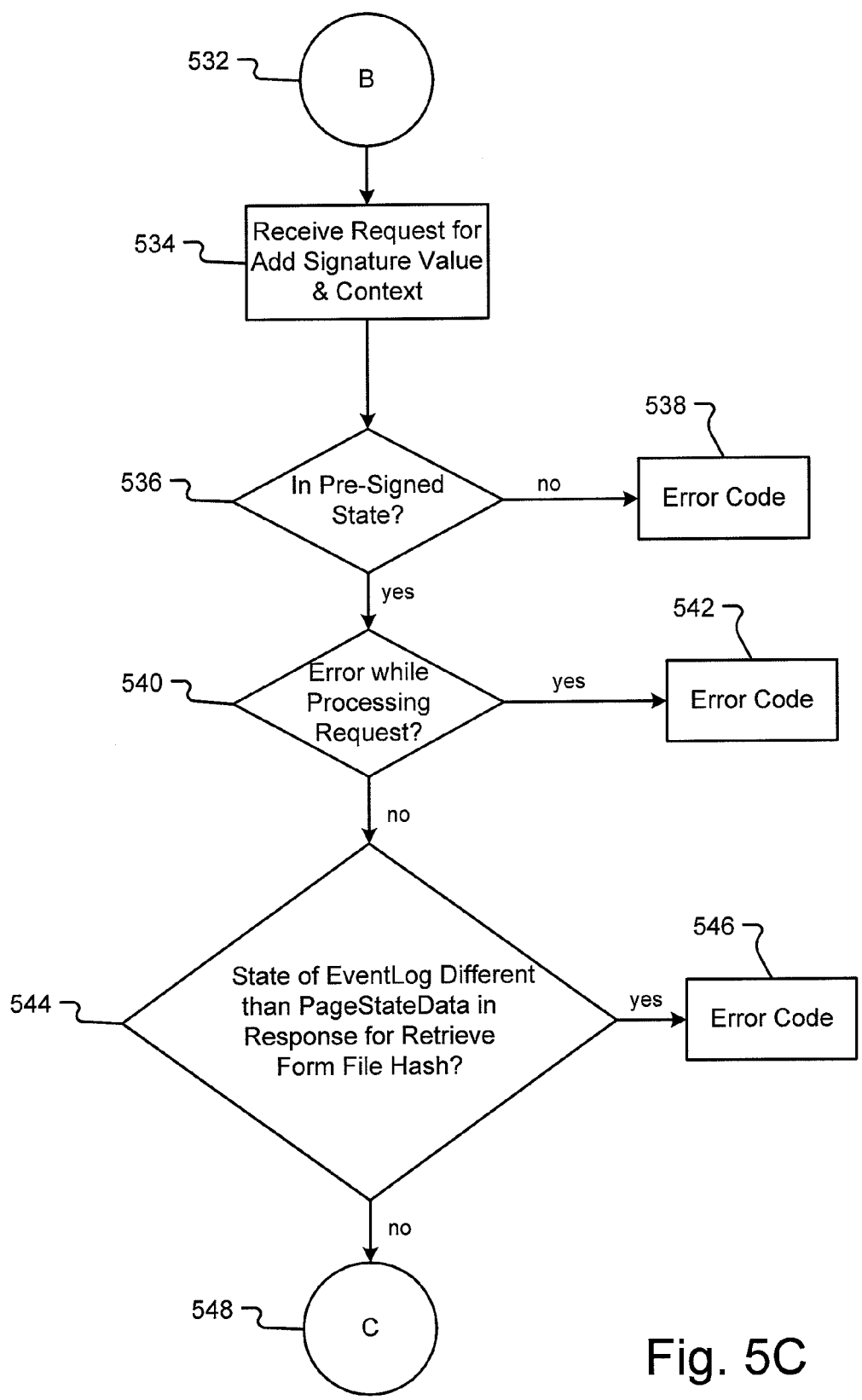
Figure 5D:
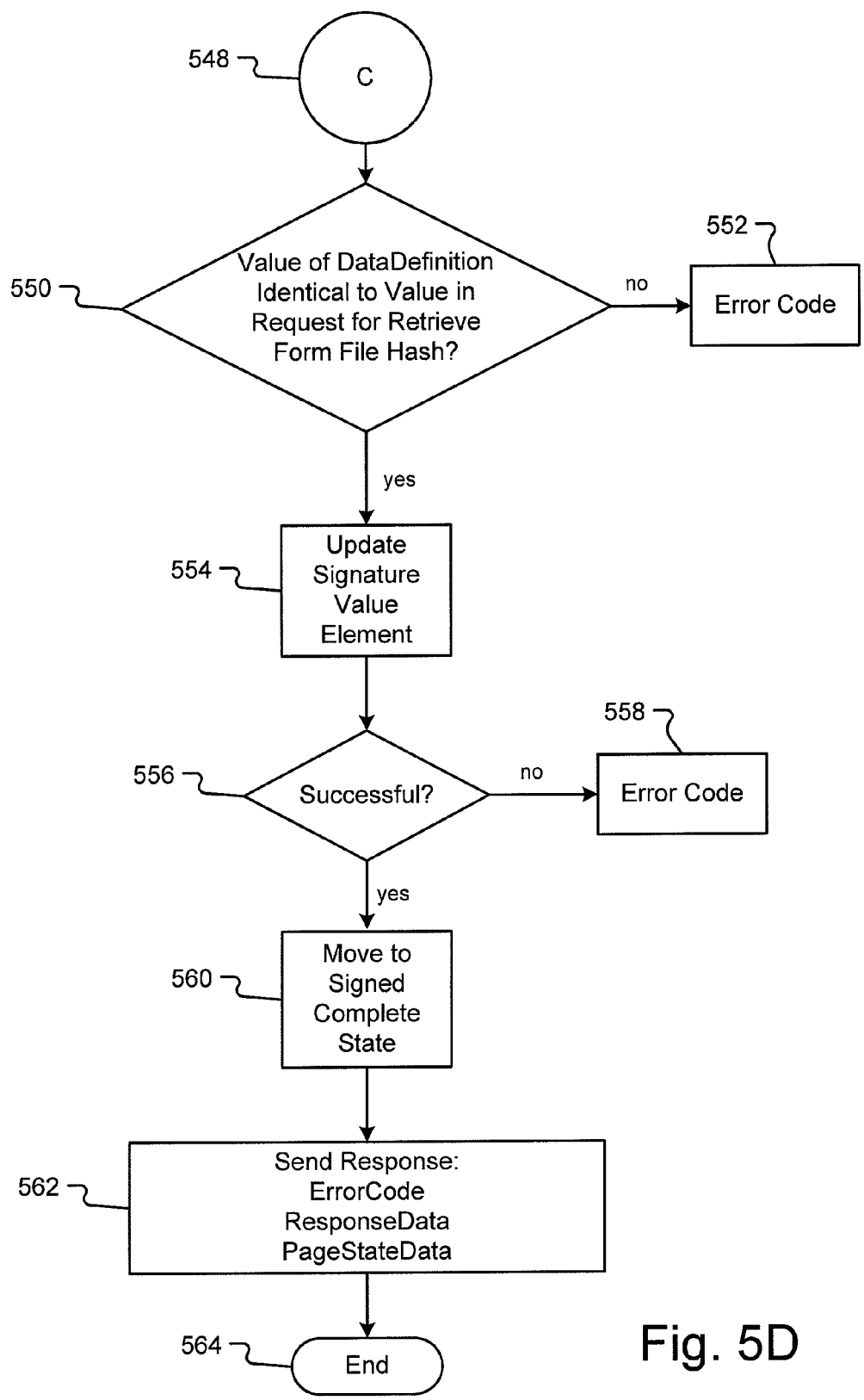

Next, process 500 continues through off-page connector B 532 to receive request for Add Signature Value and Context message 534 depicted in FIG. 5C, in which the protocol server receives such message request from the protocol client. To process this request, the protocol server determines whether the form file identified in the Add Signature Value and Context message from the protocol client is in the Pre-Signed State 536. If the form file is not in the Pre-Signed State, process 500 proceeds NO to error code operation 538, in which the protocol server ceases processing the request and returns an ErrorCode indicating failure of the process. In an embodiment, for example, the ErrorCode returns a value other than "1" to indicate failure. If the form file is in the Pre-Signed State, process 500 next proceeds YES to query 540 for determining whether an error has occurred while processing the request. If an error occurs, process 500 proceeds YES to error code operation 542, in which the protocol server stops processing the request and returns an ErrorCode with a value other than "1," for example, to indicate failure of the process. In embodiments, step 540 occurs simultaneously with step 536 for determining whether the form file is in the Pre-Signed State. In other embodiments, steps 536 and 540 are separate, as indicated in process 500. In yet other embodiments, these steps are rearranged such that step 540 occurs before step 536, for example. If no error occurs while processing the request, process 500 next proceeds to query 544 for verifying whether the State entry of the EventLog in the client message is different from the PageStateData sent in the Retrieve Form File Hash response. If differences exist, process 500 proceeds YES to error code operation 546, in which the protocol server ceases the processing of the request and returns an error code with a value indicating failure, such as, for example, a value of "1" in embodiments.

Where there are no differences, process 500 proceeds NO through off-page connector C 548 to query operation 550 for determining whether the value of the DataDefinition in the protocol client request message matches the value received in the request for Retrieve Form File Hash, as depicted in FIG. 5D in accordance with embodiments. If the values for the DataDefinition property are not identical between the messages, process 500 proceeds NO to error code operation 552, in which the protocol server returns an ErrorCode indicating a signing error. If the values for the DataDefinition property match, process 500 proceeds YES to update the SignatureValue element operation 554, in which the SignatureValue element is updated as consistent with the request from the protocol client. Process 500 next proceeds to query 556 to determine whether operations 544, 550, and 554, for example, are successfully completed, in which process 500 proceeds NO to error code operation 558 if success is not determined, and an ErrorCode indicating such failure is returned in response to the protocol client from the protocol server. If the operations are successful, process 500 proceeds YES to move the form file to Signed Complete State operation 560, in which the protocol server moves the state of the form file to the Signed Complete State. The protocol server also sends 562 an Add Signature Value and Context response to the protocol client, in which such response comprises an ErrorCode indicating success or failure of the process, ResponseData, and PageStateData. In an embodiment, the ResponseData comprises an empty string, and the PageStateData comprises a set of properties of protocol server implementation specific data where the protocol server maintains such properties. If the protocol server does not maintain such properties, the value for PageStateData returned is empty, in accordance with embodiments. Process 500 then terminates at END operation 564.

FIGS. 5A-5D are examples of possible operational characteristics for applying, through a protocol server and a protocol client, a digital signature to a form file in accordance with embodiments disclosed herein. Operational steps depicted may be combined into other steps and/or rearranged. Further, fewer or additional steps may be used, for example.

Figure 6A:
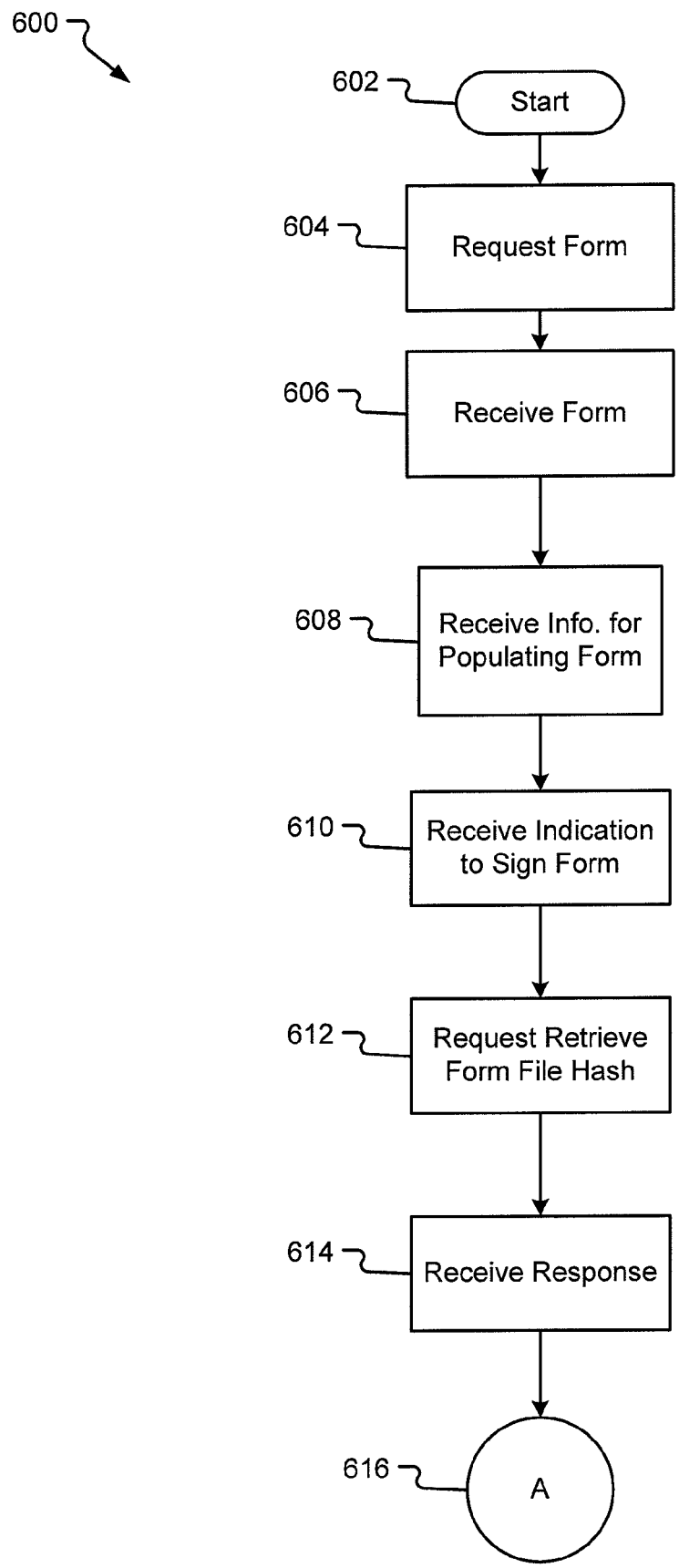
FIG. 6A illustrates a flow diagram depicting the operational characteristics of a process for detecting whether to request to cancel the application of a digital signature to a form file for the form depicted in FIG. 2, for example, in accordance with embodiments of the present disclosure.

While FIGS. 5A-5D depict a process for applying a digital signature to a form file, FIG. 6A illustrates the operational characteristics of a process 600 for detecting whether to request to cancel the application of a digital signature to a form file for the form depicted in FIG. 2, for example, in accordance with embodiments of the present disclosure. START operation 602 is initiated, and process 600 proceeds to request form operation 604, in which a protocol client requests a form or other document from a server, such as a protocol server, storing form files. In embodiments, a user indicates the form desired based on browsing through a library of forms, entering a form's URL access address, etc. After requesting the form from the server, the client receives the form 606, which is displayed to a user, for example. The client next receives information and/or data for populating the form fields or groups 608, for example, such as through data received from an input device acted upon by a user in viewing the form rendered by a user interface module at the client computer. In embodiments, the client also receives an indication, such as from a user, to apply a digital signature to the form 610. In response to such indication, the client sends a message request to the server to initiate the signing process. In embodiments, such request is a Retrieve Form File Hash request 612 for initiating the signing process. After the server processes such request, the client receives a response 614, such as a Retrieve Form File Hash response in embodiments.

Figure 6B:
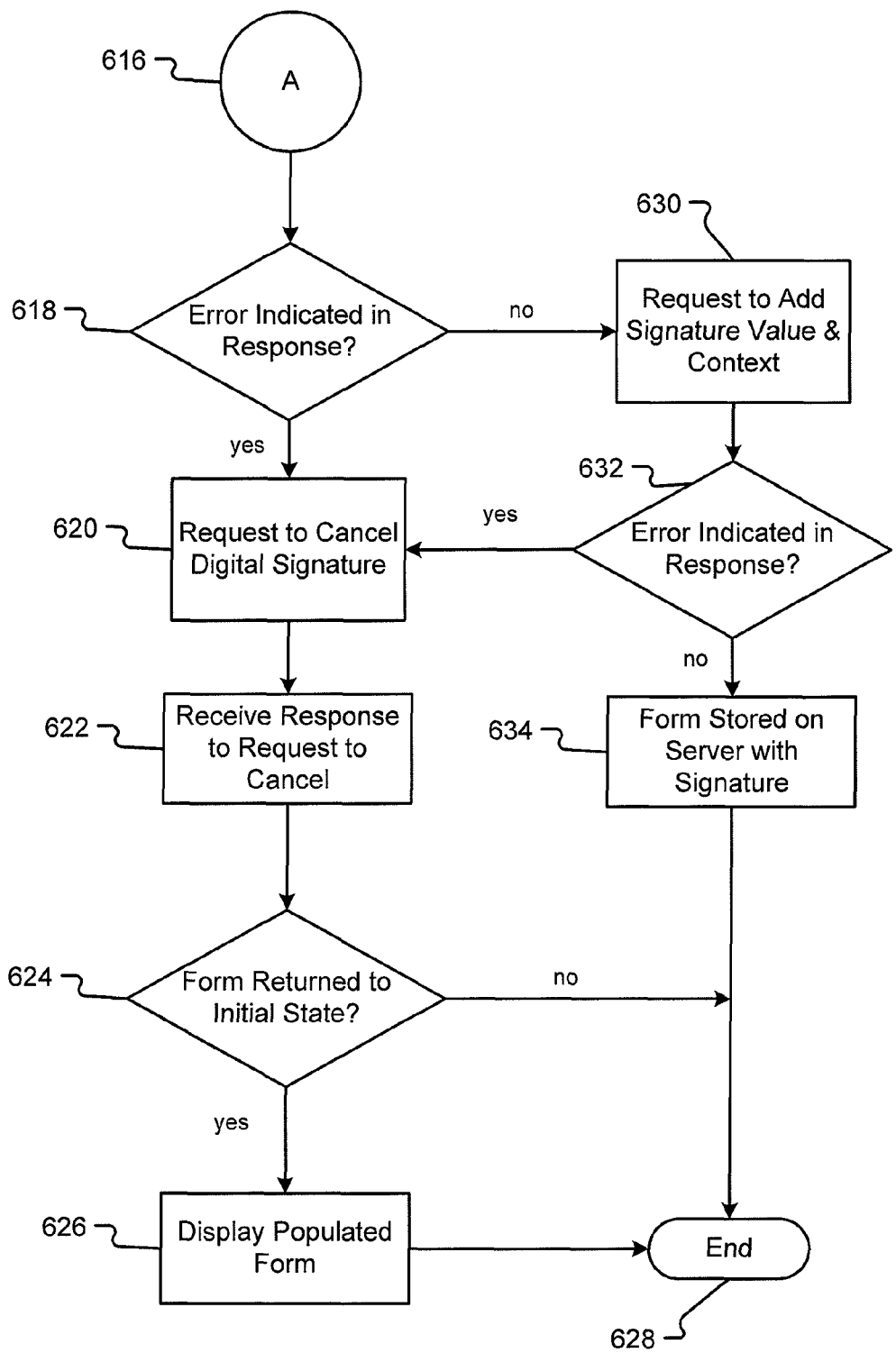
FIG. 6B depicts a flow diagram depicting the operational characteristics of a process for detecting whether to request to cancel the application of a digital signature to a form file for the form illustrated in FIG. 2, for example, in accordance with embodiments of the present disclosure.

Process 600 next continues through off-page connector A 616 to query operation 618 for determining whether an error indicating failure is received in the response message, as depicted in FIG. 6B in accordance with embodiments disclosed herein. If an error indicating failure, such as an ErrorCode with a value other than "1" in embodiments, is received, process 600 proceeds YES to request to cancel digital signature operation 620. The client thus sends a request message to the server to cancel application of the digital signature to the form file. After processing the request to cancel digital signature, the server sends a response message to the client indicating whether the processing of the request was successful. The client receives this response to the request to cancel 622. Next, the client determines if the form file has been returned to its Initial State 624. If the form file has been returned to its Initial State 624, process 600 proceeds YES to display the populated form 626, in which any data previously entered in the form is maintained. Process 600 then terminates at END operation 628.

Returning to step 618, if no error is indicated in the response message from the server, process 600 proceeds NO to request to Add Signature Value & Context 630, in which the client proceeds with the signing process by requesting that the Signature Value and Context be added for the digital signature. The client receives a response to the Add Signature Value & Context request and determines whether an error indicating failure of the process is indicated in the response 632. If no error is detected, process 600 proceeds NO to the storing of the form on the server with the completed signature 634, e.g., Signed Complete State. Process 600 then terminates at END operation 628. On the other hand, if an error is indicated in the response to Add Signature Value & Context 632, process 600 proceeds YES to request to cancel digital signature 620, and steps 620 through 628 then occur as described above, in which process 600 terminates at END operation 628.

FIGS. 6A-6B are examples of possible operational characteristics for detecting whether to request to cancel the application of a digital signature to a form file in accordance with embodiments disclosed herein. Operational steps depicted may be combined into other steps and/or rearranged. Further, fewer or additional steps may be used, for example.

Figure 7:
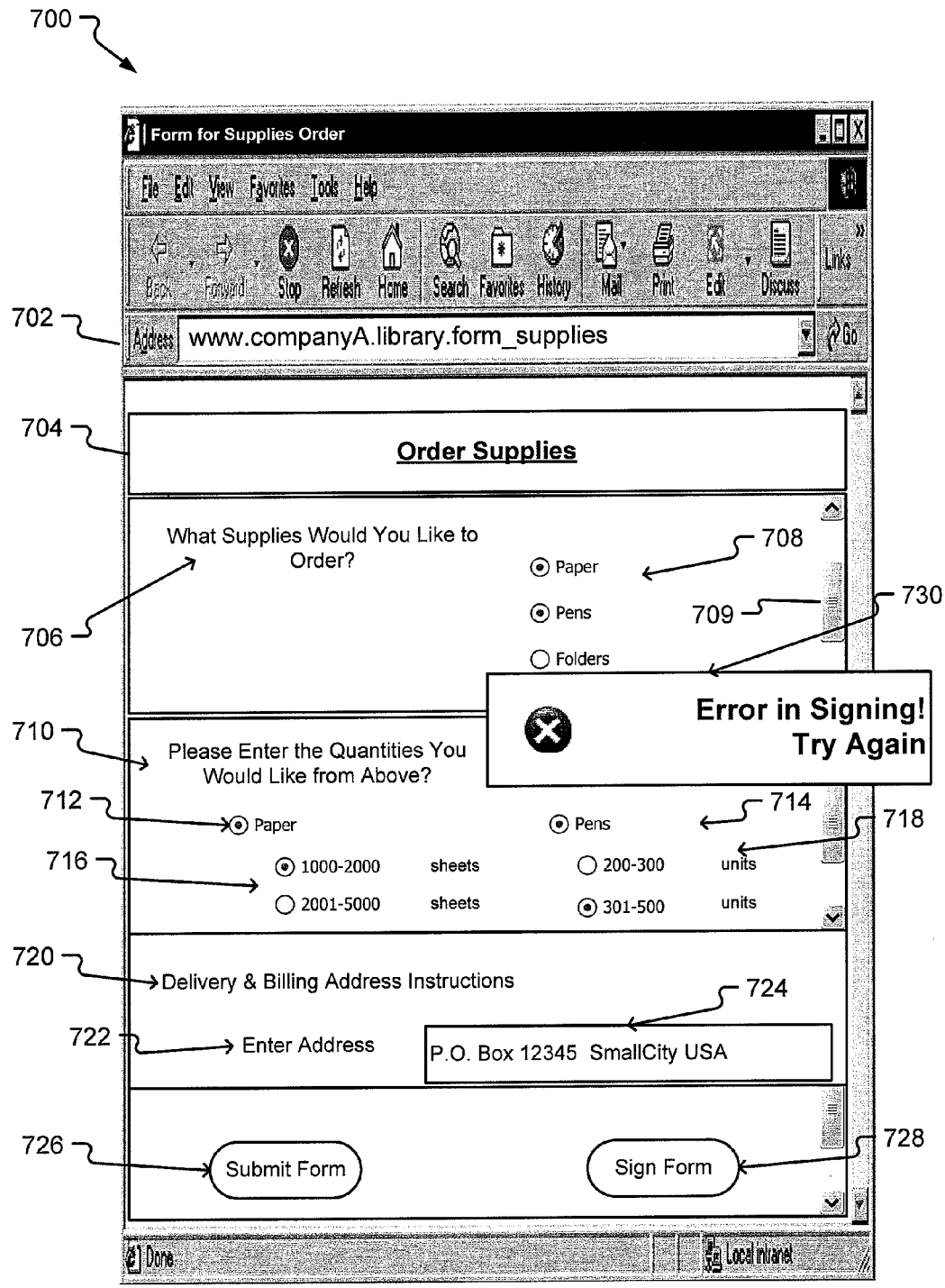
FIG. 7 illustrates an example user interface (UI) of a form, such as the form depicted in FIG. 2, for example, showing an error message received for a failed signing process of the form file in accordance with embodiments of the present disclosure.

While FIGS. 6A and 6B illustrate the operational characteristics for detecting whether to request to cancel the application of a digital signature to a form file, FIG. 7 depicts an example user interface (UI) 700 of a form, such as the form depicted in FIG. 2, for example, showing an error message received for a failed signing process of the form file in accordance with embodiments of the present disclosure. As shown in FIG. 2, features 702, 704, 706, 708, 709, 710, 712, 714, 716, 718, 720, 722, 724, 726, and 728 (similar to features 202-228) display various example fields, data entry boxes, text, selectors, etc., for completing a form. In response to selecting, or "clicking," the button to "Sign Form" 728, and if an error occurs in the processing of the signing request, an error message 730 is displayed. In embodiments, the error message indicates that the user may elect to retry the signing and/or submitting of the form. In other embodiments, only an error message is displayed with no indication to "Try Again" 730. In yet another embodiment, no error message is displayed. The error message 730 shown in FIG. 7 is offered as an example embodiment. In another embodiment, where there is an error during the signing process, a JavaScript dialog is presented, in which the JavaScript dialog states that an error has occurred, and the user should retry signing. In a further embodiment where there is an error with the Event- Log, for example, an error dialog showing a "security mismatch" error message is displayed. In an example implementation, an INFOPATH FORM SERVICES error dialog is displayed. In yet a further embodiment, where there is a problem with a certificate being transmitted, an error message rendered in the ActiveX dialog is displayed, for example.

According to embodiments, the error message is displayed after the client has received an indication of an error from the server in processing the signing request and after the signing process is successfully cancelled in response to a request from the client for the same. If the signing process is successfully cancelled, the form file is returned to the Initial State, in which the data selected and entered in user interface form 700 is not lost and can be displayed to the user at the client computer. In other embodiments, the error message is displayed during the signing process when an error is detected and before the sending of a request message to cancel the digital signature. In yet other embodiments, the error message is displayed after the sending of a request to cancel the digital signature but before the completion of the processing of such request. While error message 730 is displayed in user interface 700 in accordance with an embodiment disclosed herein, other embodiments, as discussed above, provide for no error message to be displayed but, rather, for the user to be otherwise notified of an error in the processing of the signing request. In yet other embodiments, no error message is displayed, but the client, instead, automatically retries the request for the digital signing of the associated form file. As noted above, UI 700 with error message 730 is offered for purposes of illustration only. Any type of user interfaces can be used in accordance with embodiments disclosed herein. Further, the specific buttons, radio controls, text entry boxes, text, selection indicators, etc. are offered by way of example only for purposes of illustration. Any type, arrangement, and content of buttons, radio controls, text entry boxes, text, selection indicators, and/or other form features and functions may be used in accordance with embodiments disclosed herein. Further, as noted, any type of error message known to those of skill in the art may be displayed. While user interface 700 shows an indicator of "Local intranet," as consistent with the Order of Supplies from "CompanyA" in the example depicted, other embodiments provide for the use of the Internet or other network, including the World Wide Web ("WWW" or "Web"), for example.

Figure 8A:
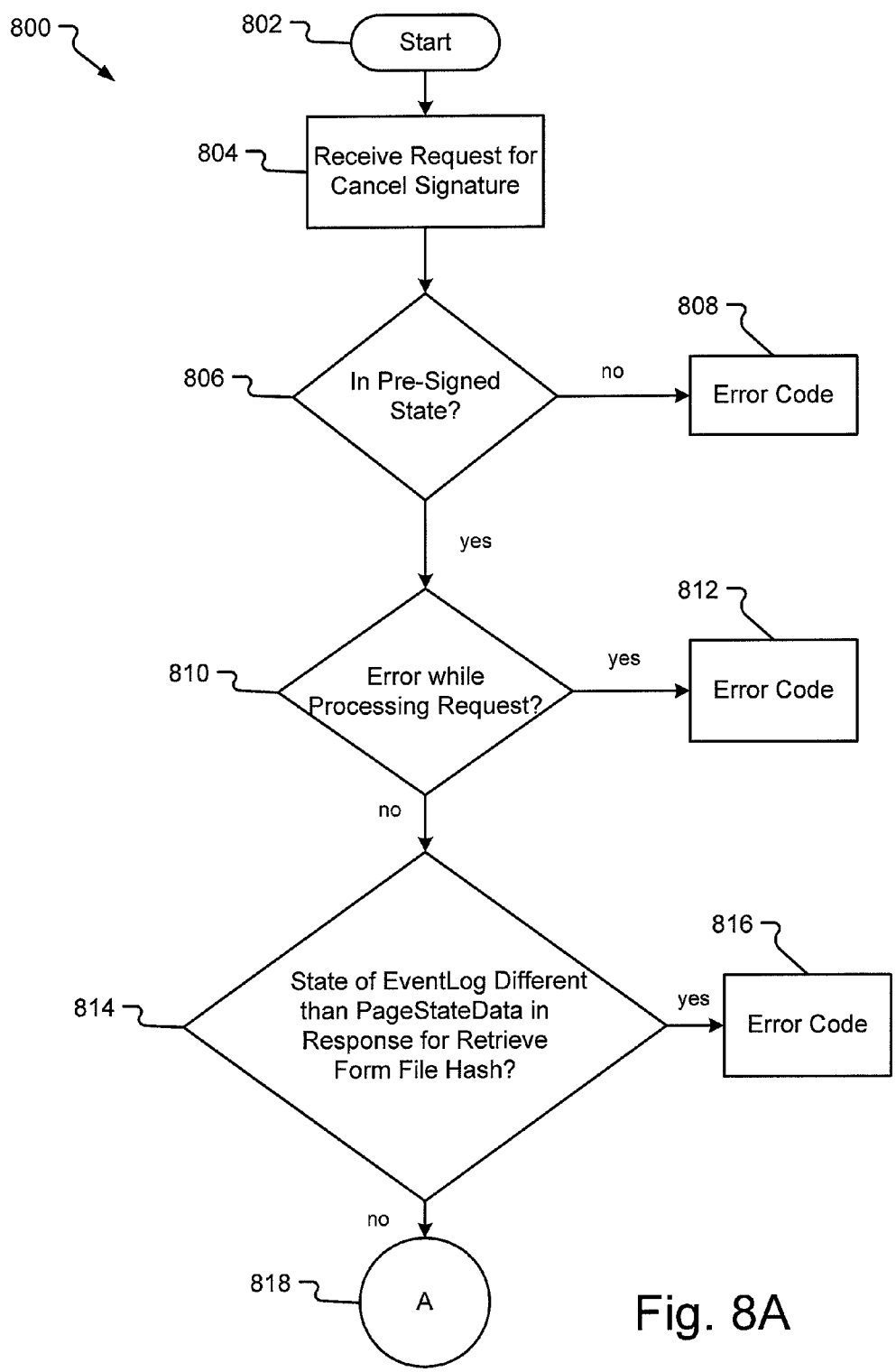
FIG. 8A depicts a flow diagram illustrating the operational characteristics for processing a request for cancelling the application of a digital signature to a form file for the form illustrated in FIG. 2, for example, in accordance with embodiments of the present disclosure.
Figure 8B:
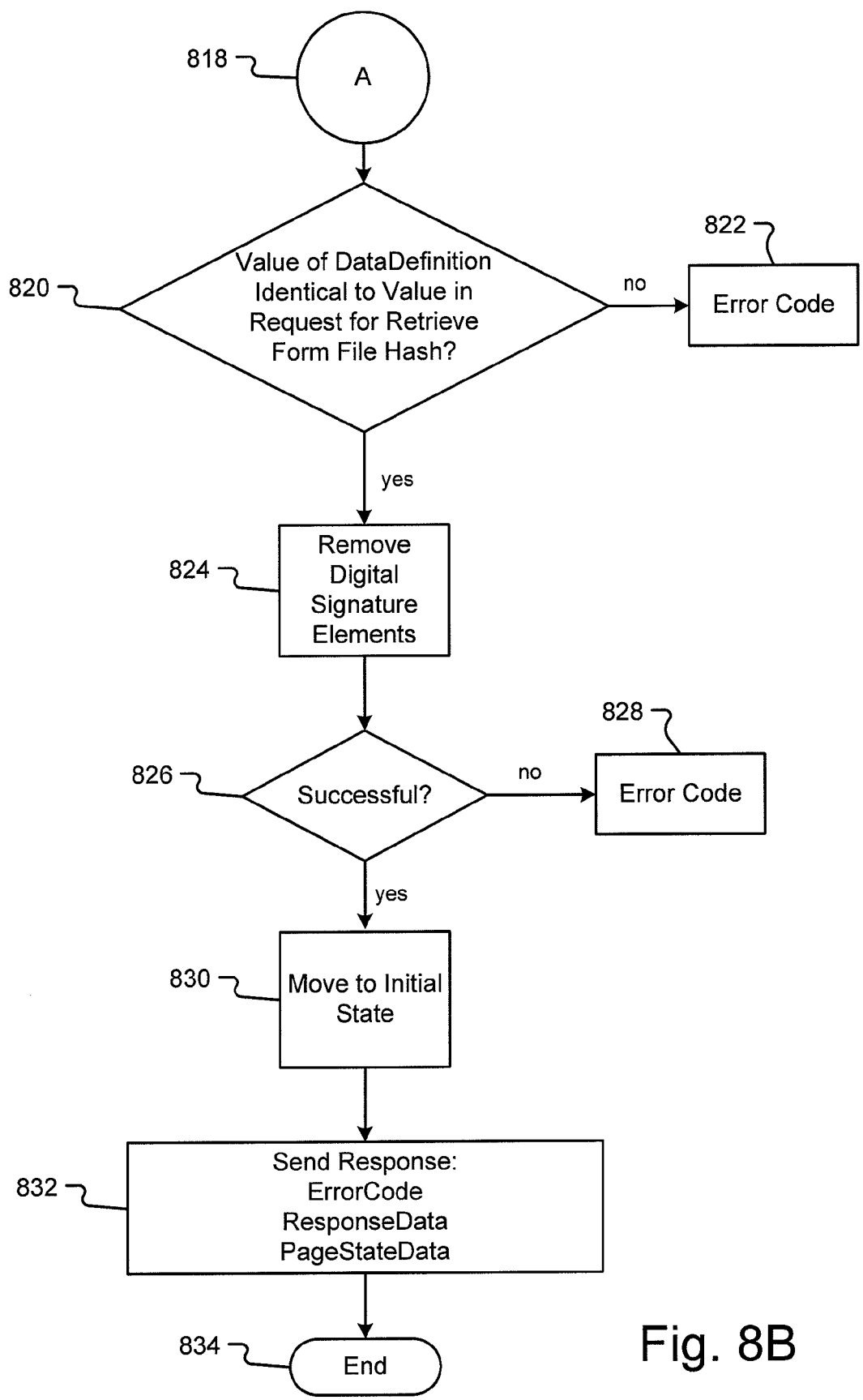
FIG. 8B illustrates a flow diagram depicting the operational characteristics for processing a request for cancelling the application of a digital signature to a form file for the form illustrated in FIG. 2, for example, in accordance with embodiments of the present disclosure.

Turning to FIG. 8A, this figure depicts the operational steps 800 for processing a request for cancelling the application of a digital signature to a form file for the form illustrated in FIG. 2, for example, in accordance with embodiments of the present disclosure. START operation 802 is initiated with the sending by a server of an error code to a client indicating the presence of an error during a signing session, and process 800 proceeds to receive request for cancel signature operation 804. For example, in embodiments, the client receives and/or detects an error in the signing process in a response transmitted from the server and sends a request to the server to cancel the application of the digital signature to the particular form file. After receiving the request to cancel digital signature, process 800 proceeds to query 806 for determining whether the form file identified by the protocol client message is in the Pre-Signed State. If the form file is not in the Pre-Signed State, process 800 proceeds NO to error code operation 808, in which the protocol server stops processing the request and returns an ErrorCode indicating a failure, such as a value other than "1," according to embodiments. If the server determines that the form file is in the Pre-Signed State, process 800 proceeds YES to query 810 for determining whether an error occurs while processing the request 810. If an error occurs while processing the request, process 800 proceeds YES to error code operation 812, in which the protocol server ceases with the processing of the request and returns an ErrorCode indicating a failure, such as a value other than "1," for example. In embodiments, step 810 occurs simultaneously with step 806 for determining whether the form file is in the Pre-Signed State. In other embodiments, steps 806 and 810 are separate, as indicated in process 800. In yet other embodiments, these steps are rearranged such that step 810 occurs before step 806, for example. If no error occurs while processing the request to cancel the digital signature, process 800 next proceeds NO to query 814 for determining whether the State entry of the EventLog in the client message differs from the PageStateData sent in the response to the initial signing request, such as a Retrieve Form File Hash response. If differences exist, process 800 proceeds YES to error code operation 816, in which the server returns an ErrorCode indicating a failure, such as a value other than "1," in accordance with embodiments.

Where no differences exist, process 800 next proceeds NO through off-page connector A 818 to query operation 820 for verifying whether the value of the DataDefinition sent by the client message is identical to the value received in the initial signing request, such as in a Retrieve Form File Hash request, according to embodiments, as depicted in FIG. 8B in accordance with embodiments disclosed. If the values of the DataDefinition property differ, process 800 proceeds NO to error code operation 822, in which the server returns an ErrorCode indicating a signing error. On the other hand, if the values of the DataDefinition property match, process 800 proceeds YES to remove any digital signature elements 824 that have been added to the form file as the result of the processing of a request for digital signing, such as a request for Retrieve Form File Hash message, in the same signing session. Next, it is determined whether the operations 806, 814, 820, and 824, for example, have been successful at query 826. If the operations have not been successful, process 800 proceeds NO to error code operation 828, in which the server returns an ErrorCode indicating a failure of the cancel digital signature process. If the operations have been successful, process 800 proceeds YES to move the state of the form file to Initial State operation 830, in which the server moves the state of the form file. Next, the server returns a response 832 to the cancel digital signature request, in which the response comprises, in embodiments, an ErrorCode indicating success or failure of the processing of the request, ResponseData, and PageStateData. In an embodiment, the ResponseData is an empty string, and the PageStateData comprises a set of properties of protocol server implementation specific data where the server persists such properties. If the server does not persist such properties, the value of PageStateData is empty, according to embodiments. Process 800 then terminates at END operation 834.

FIGS. 8A-8B are examples of possible operational characteristics for processing a request for cancelling the application of a digital signature to a form file in accordance with embodiments disclosed herein. Operational steps depicted may be combined into other steps and/or rearranged. Further, fewer or additional steps may be used, for example.

Figure 9:
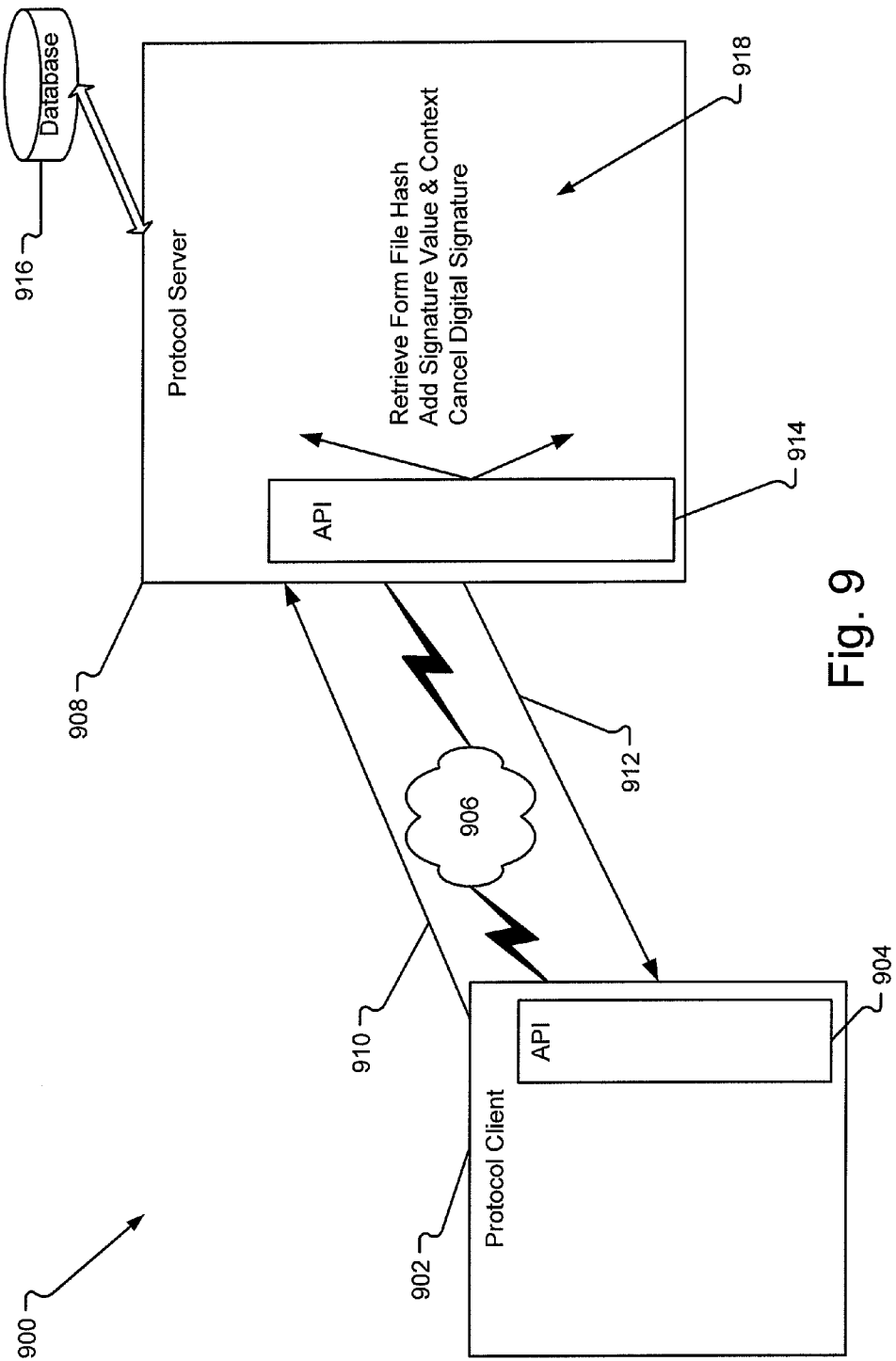
FIG. 9 depicts a logical representation of example functional component modules for the interactions of a protocol client and a protocol server during a signing session of a form file and/or during cancellation of the application of a digital signature to a form file in accordance with embodiments of the present disclosure.

Next, FIG. 9 depicts a logical representation 900 of example functional component modules for the interactions of a protocol client and a protocol server during a signing session of a form file and/or during cancellation of the application of a digital signature to a form file in accordance with embodiments of the present disclosure.

While FIG. 1 shows example environment or system 100 for applying and/or cancelling the application of a digital signature to a form file stored on a protocol server, FIG. 9 illustrates example software functional modules 900 corresponding to such computing units for enabling such digital signing and cancellation capabilities by a protocol client 902 and a protocol server 908 in accordance with embodiments disclosed herein. Storage means 916 for storing form files, for example, are also depicted in FIG. 9. These storage means and functional modules are offered by way of example only. Numerous types of modules, components, and/or storage means can be used in accordance with embodiments disclosed herein. At client computer 104 of FIG. 1, a browser (not shown) retrieves protocol client 902. For example, in an embodiment, protocol client 902 is downloaded at client computer 104 through a Web browser, such as MICROSOFT INTERNET EXPLORER, produced by MICROSOFT CORPORATION of Redmond, Wash. Any type of browser can be used as consistent with embodiments disclosed herein. For example, in embodiments where the protocol client is implemented by MICROSOFT SHAREPOINT DIGITAL SIGNATURE CONTROL FOR FORMS SERVICES and is an ActiveX control, for example, any type of browser supporting ActiveX can be used. For example, MICROSOFT INTERNET EXPLORER, as mentioned above, supports ActiveX. In other embodiments, custom ActiveX plug-ins are available for other types of browsers. As a further example embodiment, a Mozilla Firefox plug-in for working with an ActiveX control is used. In still further embodiments involving protocol client implementations other than MICROSOFT SHAREPOINT DIGITAL SIGNATURE CONTROL FOR FORMS SERVICES, types of browsers without support for ActiveX technology may be used. Thus, embodiments provide for types of protocol client implementations to operate in browser environments with no support for ActiveX technology.

In embodiments, the protocol client is already downloaded or otherwise available in non-removable or removable memory associated with client computer 104. In such embodiments, protocol client 902 and client computer 902 can be used interchangeably. Protocol client 902 receives input data from a user(s) for filling out a form, for example, in accordance with embodiments. In other embodiments, protocol client 902 receives input data from another computing device(s) and/or computer program(s). Upon receiving input data filling out a particular form, protocol client 902 requests that such form be digitally signed by sending a request message 910 over network 906 to protocol server 908. Protocol server 908 thus receives the request message 910. In embodiments, API 914 on protocol server 908 acts as an interface between protocol client 902 and protocol server 908. API 914 thus processes the received request message to initiate the digital signing process. In embodiments, an API 904 on protocol client 902 acts as an interface between protocol client 902 and protocol server 908 for formulating request messages and processing response messages. For example, API 904 formulates request messages into the proper format, syntax, and structure, for example, for sending to protocol server 908 for processing. Such messages, for example, may be formatted in accordance with the InfoPath Digital Signing Protocol Specification [MS-IPDSP], provided by MICROSOFT CORPORATION of Redmond, Wash.

After processing the received request message to initiate the signing process, for example, protocol server responds with a response message 912 which is transmitted over network 906 to protocol client 902. An example embodiment disclosed herein provides for the following request and response messages 918, in accordance with the InfoPath Digital Signing Protocol Specification Retrieve Form File Hash request, Retrieve Form File Hash response, Add Signature Value & Context request, Add Signature Value & Context response, Cancel Digital Signature request, and Cancel Digital Signature response 918.

For example, the following request 910 is sent by protocol client 902 to protocol server 908 over network 906 to initiate the signing process, in accordance with embodiments disclosed herein:

Request for Retrieve Form File Hash

This message is sent by the protocol client to initiate the signing process.

The message body, in embodiments, is an XML document, as specified in [W3C-XML], which conforms to the following XML Schema:

```
<xsd:element name="SignRequest">
<xsd:complexType>
    <xsd:all>
            <xsd:element ref="EventLog" minOccurs="1" maxOccurs="1"/>
            <xsd:element ref="DataDefinition" minOccurs="1" maxOccurs="1"/>
            <xsd:element ref="Comment" minOccurs="1" maxOccurs="1"/>
            <xsd:element ref="Time" minOccurs="1" maxOccurs="1"/>
            <xsd:element ref="OS" minOccurs="1" maxOccurs="1"/>
            <xsd:element ref="Browser" minOccurs="1" maxOccurs="1"/>
        <xsd:element ref="Version" minOccurs="1" maxOccurs="1"/>
     <xsd:element ref="Monitors" minOccurs="1" maxOccurs="1"/>
      <xsd:element ref="Width" minOccurs="1" maxOccurs="1"/>
      <xsd:element ref="Height" minOccurs="1" maxOccurs="1"/>
     <xsd:element ref="Colors" minOccurs="1" maxOccurs="1"/>
      <xsd:element ref="PNG" minOccurs="1" maxOccurs="1"/>
    </xsd:all>
</xsd:complexType>
</xsd:element>
<xsd:element name="EventLog" type="xsd:string"/>
<xsd:element name="DataDefinition" type="xsd:string"/>
<xsd:element name="Comment" type="xsd:string"/>
<xsd:element name="Time" type="xsd:string"/>
<xsd:element name="OS" type="xsd:string"/>
<xsd:element name="Browser" type="xsd:string"/>
<xsd:element name="Version" type="xsd:string"/>
<xsd:element name="Monitors" type="xsd:string"/>
<xsd:element name="Width" type="xsd:string"/>
<xsd:element name="Height" type="xsd:string"/>
```

```
<xsd:element name="Colors" type="xsd:string"/>
<xsd:element name="PNG" type="xsd:base64Binary"/>
```

EventLog: As specified in section 2.2.1.2.1.1:
  Protocol Server Specific Event Log
  A semicolon separated string of values specifying protocol server specific information. Using the ABNF syntax, as specified in [RFC5234], the event log conforms to the following specification, according to embodiments:
  EventLog=(Header)17*(";" Entry)(";" State)7*(";" Entry)
  Header=1*CHAR
  Entry=*CHAR
  State=*CHAR
DataDefinition: The string indicating the signed data block of the form file being signed, as specified in [MS-IPFF] section 2.2.15 and [MS-IPFF2] section 2.2.1.1.15:
  xdSignedDataBlockName
  This simple type specifies restrictions for specifying the name of a signed data block.
  Referenced By
  signedDataBlock.xsfschema@name
  The following W3C XML Schema ([XMLSCHEMA1] section 2.1) fragment specifies the contents of this simple type.

```
<xsd:simpleType name="xdSignedDataBlockName">
    <xsd:restriction base="xsd:ID">
        <xsd:minLength value="1"/>
        <xsd:maxLength value="255"/>
    </xsd:restriction>
</xsd:simpleType>
```

Comment: The comment for the digital signature (2) as specified in [MS-IPFFX] section 2.1.2.1.
  Comment
  This element specifies the comment provided by the user for the signature. The value of this element may be a valid UNICODE UTF-16 string, as specified in [RFC2781], according to embodiments.
  The following W3C XML Schema ([XMLSCHEMA1] section 2.1) fragment specifies the contents of this element.
    `<xsd:element name="Comment" type="xsd:string"/>`
Time: The system date and time for the client computer as specified in [MS-IPFFX] section 2.1.2.3.
  UntrustedSystemDateTime
  This element specifies the system date and time of the client computer at the time of signing. The value of this element is expressed in Coordinated Universal Time (UTC) using the "complete date plus hours, minutes and seconds" format as specified in [ISO-8601], according to embodiments.
  Parent Elements
  NonRepudiation
  The following W3C XML Schema ([XMLSCHEMA1] section 2.1) fragment specifies the contents of this element.
    `<xsd:element name="UntrustedSystemDateTime" type="xsd:dateTime"/>`
OS: The version of the operating system running on the client computer at the time of signing as specified in [MS-IPFFX] section 2.1.2.5.

OperatingSystem
This element specifies the version of the operating system on the client computer at the time of signing.
  Parent Elements
  SystemInformation
  The following W3C XML Schema ([XMLSCHEMA1] section 2.1) fragment specifies the contents of this element.

```
<xsd:element name="OperatingSystem">
    <xsd:simpleType>
        <xsd:restriction base="xsd:decimal">
            <xsd:pattern value="[0-9][.][0-9]"/>
        </xsd:restriction>
    </xsd:simpleType>
</xsd:element>
```

Browser: The name and the version of the Web browser used on the client computer to sign the form as specified in [MS-IPFFX] section 2.1.2.9.
  Browser
  This element specifies the name of the Web browser used by the form server to sign the form. When signing using the client computer, this element is omitted, according to embodiments.
  Parent Elements
  SystemInformation
  The following W3C XML Schema ([XMLSCHEMA1] section 2.1) fragment specifies the contents of this element.

```
<xsd:element name="Browser">
    <xsd:simpleType>
        <xsd:restriction base="xsd:string">
            <xsd:enumeration value="Microsoft Internet Explorer 6.0"/>
            <xsd:enumeration value="Microsoft Internet Explorer 7.0"/>
            <xsd:enumeration value="Microsoft Internet Explorer 8.0"/>
        </xsd:restriction>
    </xsd:simpleType>
</xsd:element>
```

Version: The version of the protocol server that last edited the form file as specified in [MS-IPFFX] section 2.1.2.8.
  ServerVersion
  This element specifies the version of the form server that last edited the form file. When the form server signs the form in the Web browser, the value of this element is "12" or "14," according to embodiments. When signing using the client computer, this element is omitted, according to embodiments.
  Parent Elements
  SystemInformation
  The following W3C XML Schema ([XMLSCHEMA1] section 2.1) fragment specifies the contents of this element.

```
<xsd:element name="ServerVersion">
    <xsd:simpleType>
```

```
        <xsd:restriction base="xsd:string">
            <xsd:enumeration value="12"/>
            <xsd:enumeration value="14"/>
        </xsd:restriction>
    </xsd:simpleType>
</xsd:element>
```

Monitors: The number of monitors enabled on the client computer at the time of signing as specified in [MS-IPFFX] section 2.1.2.12.
  NrOfMonitors
  This element specifies the number of monitors enabled on the client computer at the time of signing.
    Parent Elements
    ScreenInformation
    The following W3C XML Schema ([XMLSCHEMA1] section 2.1) fragment specifies the contents of this element.
      <xsd:element name="NrOfMonitors" type="xsd:integer"/>
Width: The width of the primary monitor on the client computer at the time of signing as specified in [MS-IPFFX] section 2.1.2.14.
  Width
  This element specifies the width of the primary monitor on the client computer at the time of signing.
    Parent Elements
    PrimaryMonitor
    Attributes:
    Unit: This attribute specifies the unit of measure being used for the value of Width. The value of this attribute is set to "px," according to embodiments.
    The following W3C XML Schema ([XMLSCHEMA1] section 2.1) fragment specifies the contents of this element.

```
<xsd:element name="Width">
    <xsd:complexType>
        <xsd:simpleContent>
            <xsd:extension base="xsd:integer">
                <xsd:attribute name="Unit">
                    <xsd:simpleType>
                        <xsd:restriction
                        base="xsd:string">
                            <xsd:enumeration
                            value="px"/>
                        </xsd:restriction>
                    </xsd:simpleType>
                </xsd:attribute>
            </xsd:extension>
        </xsd:simpleContent>
    </xsd:complexType>
</xsd:element>
```

Height: The height of the primary monitor on the client computer at the time of signing as specified in [MS-IPFFX] section 2.1.2.15.
  Height
  This element specifies the height of the primary monitor on the client computer at the time of signing.
    Parent Elements
    PrimaryMonitor
    Attributes:
    Unit: This attribute specifies the unit of measure being used for the value of Height. The value of this attribute is set to "px," according to embodiments.
    The following W3C XML Schema ([XMLSCHEMA1] section 2.1) fragment specifies the contents of this element.

```
<xsd:element name="Height">
    <xsd:complexType>
        <xsd:simpleContent>
            <xsd:extension base="xsd:integer">
                <xsd:attribute name="Unit">
                    <xsd:simpleType>
                        <xsd:restriction
                        base="xsd:string">
                            <xsd:enumeration
                            value="px"/>
                        </xsd:restriction>
                    </xsd:simpleType>
                </xsd:attribute>
            </xsd:extension>
        </xsd:simpleContent>
    </xsd:complexType>
</xsd:element>
```

Colors: The color depth of the primary monitor on the client computer at the time of signing as specified in [MS-IPFFX] section 2.1.2.16.
  ColorDepth
  This element specifies the color depth of the primary monitor on the client computer at the time of signing.
    Parent Elements
    PrimaryMonitor
    Attributes:
    Unit: This attribute specifies the unit of measure being used for the value of ColorDepth. The value of this attribute is set to "bpp," according to embodiments.
    The following W3C XML Schema ([XMLSCHEMA1] section 2.1) fragment specifies the contents of this element.

```
<xsd:element name="ColorDepth">
    <xsd:complexType>
        <xsd:simpleContent>
            <xsd:extension base="xsd:integer">
                <xsd:attribute name="Unit">
                    <xsd:simpleType>
                        <xsd:restriction base="xsd:string">
                            <xsd:enumeration value="bpp"/>
                        </xsd:restriction>
                    </xsd:simpleType>
                </xsd:attribute>
            </xsd:extension>
        </xsd:simpleContent>
    </xsd:complexType>
</xsd:element>
```

PNG: A representation of the form view that is displayed at the time of signing as specified in [MS-IPFFX] section 2.1.2.20.
  ScreenDumpPNG
  This element specifies a PNG representation of the view, as specified in [W3C-PNG], that is active at the time of signing. The PNG image is Base64 encoded, as specified in [RFC4648], according to embodiments.
  Parent Elements
  NonRepudiation
  The following W3C XML Schema ([XMLSCHEMA1] section 2.1) fragment specifies the contents of this element.
    <xsd:element name="ScreenDumpPNG" type="xsd:base64Binary"/>
  An example protocol client request message to initiate the signing process is as follows, according to embodiments of the present disclosure:
  An example of a protocol client request message to initiate a signing process, as specified in section 2.2.1.2.1, is illustrated here:

```
POST /_layouts/Signature.FormServer.aspx HTTP/1.1
Accept: */*
Content-Type: text/xml
Host: contoso
<SignRequest><EventLog>1
8;5;872b5f4e78e1493582a00f161142fe62_be2940ab07fd4251bbcdf0041d2bc5da;AHLZ4GUV
VKKSISFM2IIBTIRCKQRSCL2TJFKEKUZPKY2C6RCTJFDS6RSPKJGVGL2UIVGVATCB
KRCS4WCTJYVGQOCRKNJG4STIHFLVE6BUKVTE6N2CJ54WOSZYGNLWQT3PBUUM
UBYM5GEMQSIGY3EQ4Y;0;;%2Fsites%2Fv4%2Fdsig%2Fforms%2Ftemplate.xsn;http%3A
%2F%contoso%2Fsites%2Fv4%2Fdsig%2Fforms%2Ftemplate.xsn;;http%3A%2F%2Fcontoso
%2Fsites%2Fv4;;1;1;0;1;0;0;633997851883411000;;FormControl;0;1033;1033;0;13;Op0ZEFd
M7QYQwAg6724FORnJu727/iMxjDBCQU2UHqX8B/P+trBObL+1XnQzZ/s068f9gUYZp1Yx
HRgsxi3A0w==|633997856567555876</EventLog><DataDefinition>group1</DataDefinition>
<Comment></Comment><Time>2010-01-
22T19:34:33Z</Time><OS>6.0</OS><Browser>Microsoft Internet Explorer 7.0
</Browser><Version>14</Version><Monitors>1</Monitors><Width>1404</Width><Height>
1126</Height><Colors>16</Colors><PNG>(PNG IMAGE)</PNG></SignRequest>
```

In embodiments, the protocol server specific EventLog sent in request and response messages is provided for as follows:

Protocol Server Specific Event Log

A semicolon separated string of values specifying protocol server specific information. Using the ABNF syntax, as specified in [RFC5234], the event log, in embodiments, conforms to the following specification:

EventLog=(Header)17*(";" Entry)(";" State)7*(";" Entry)
Header=1*CHAR
Entry=*CHAR
State=*CHAR In an embodiment, the following request message is sent by protocol client 902 to protocol server 908 over network 906 to complete the signing process, in accordance with embodiments disclosed herein:

Request for Add Signature Value and Context

This message is sent by the protocol client to complete the signing process.

The message body, in embodiments, comprises an XML document, as specified in [W3C-XML], which conforms to the following XML Schema:

```
<xsd:element name="SignValue">
   <xsd:complexType>
      <xsd:all>
         <xsd:element ref="EventLog" minOccurs="1" maxOccurs="1"/>
         <xsd:element ref="DataDefinition" minOccurs="1" maxOccurs="1"/>
         <xsd:element ref="Value" minOccurs="1" maxOccurs="1"/>
         <xsd:element ref="Key" minOccurs="1" maxOccurs="1"/>
      </xsd:all>
   </xsd:complexType>
</xsd:element>
<xsd:element name="EventLog" type="xsd:string"/>
<xsd:element name="DataDefinition" type="xsd:string"/>
<xsd:element name="Value" type="xsd:string"/>
<xsd:element name="Key" type="xsd:string"/>
```

EventLog: This is a semicolon separated string of values containing protocol server specific information as specified in section 2.2.1.2.1.1:

Protocol Server Specific Event Log

A semicolon separated string of values specifying protocol server specific information. Using the ABNF syntax, as specified in [RFC5234], the event log conforms to the following specification, according to embodiments:

EventLog=(Header)17*(";" Entry)(";" State)7*(";" Entry)
Header=1*CHAR
Entry=*CHAR
State=*CHAR DataDefinition: The string indicating the signed data block of the form file being signed, as specified in [MS-IPFF] section 2.2.15 and [MS-IPFF2] section 2.2.1.1.15:

xdSignedDataBlockName

This simple type specifies restrictions for specifying the name of a signed data block.

Referenced By signedDataBlock.xsfschema@name

The following W3C XML Schema ([XMLSCHEMA1] section 2.1) fragment specifies the contents of this simple type.

```
<xsd:simpleType name="xdSignedDataBlockName">
   <xsd:restriction base="xsd:ID">
      <xsd:minLength value="1"/>
      <xsd:maxLength value="255"/>
   </xsd:restriction>
</xsd:simpleType>
```

Value: The value of the digital signature (2) as specified in [XMLDSig], section 4.2.

Key: The value used to populate the X509Certificate element of the X509Data node as specified in [XMLDSig], Section 4.4.4.

An example protocol client request message to the protocol server to add a signature value and context to a form file is illustrated as follows, in accordance with embodiments of the present disclosure:

An example of a protocol client request message to add a signature value and context to a form file, as specified in section 2.2.1.2.2, is illustrated here. The CERTIFICATE CONTEXT specified in the following example is a binary representation of a certificate specified as key in the section 2.2.1.2.2. The value of CERTIFICATE CONTEXT is abbreviated for readability.

```
POST /_layouts/Signature.FormServer.aspx HTTP/1.1
    Content-Type: text/xml
    Host: contoso
<SignValue><EventLog>1
8;5;872b5f4e78e1493582a00f161142fe62_be2940ab07fd4251bbcdf0041d2bc5da;AHLZ4GUV
VKKSISFM2IIBTIRCKQRSCL2TJFKEKUZPKY2C6RCTJFDS6RSPKJGVGL2UIVGVATCB
KRCS4WCTJYVGQOCRKNJG4STIHFLVE6BUKVTE6N2CJ54WOSZYGNLWQT3PBUUM
UBYM5GEMQSIGY3EQ4Y;0;;%2Fsites%2Fv4%2Fdsig%2Fforms%2Ftemplate.xsn;http%3A
%2F%2Fcontoso%2Fsites%2Fv4%2Fdsig%2Fforms%2Ftemplate.xsn;;
http%3A%2F%2Fcontoso
%2Fsites%2Fv4;;1;1;0;1;0;0;633997851883411000;;FormControl;0;1033;1033;0;13;Op0ZEFd
M7QYQwAg6724FORnJu727/iMxjDBCQU2UHqX8B/P+trBObL+1XnQzZ/s068f9gUYZp1Yx
HRgsxi3A0w==|633997856567555876</EventLog><DataDefinition>group1</DataDefinition>
<Value>iWFKsksj4iFefBoOd1FCLLDs7B8vfqHd7s2IJaI6r2r0kL0HR1Zq5Q33vAuNZYsNYU
uiS4ZeCxznY69BY5eJ1SdnrQlOTDMIldFvDFCF7H+mPIRYQlkTZZiTYZInmIhUkFVh4q+/m
bBVRTT5xfFM5QrOD41R0jLPsrLCNEk=</Value><Key>(CERTIFICATE
CONTEXT)</Key></SignValue>
```

In further embodiments, the following request message is sent by protocol client 902 to protocol server 908 over network 906 to cancel the signing process, in accordance with embodiments disclosed herein:

Request for Cancel Digital Signature

This message is sent by the protocol client to cancel the signing process.

The message body, in embodiments, comprises an XML document, as specified in [W3C-XML], which conforms to the following XML Schema:

```
<xsd:element name="SignCancel">
    <xsd:complexType>
        <xsd:all>
            <xsd:element ref="EventLog" minOccurs="1" maxOccurs="1"/>
            <xsd:element ref="DataDefinition" minOccurs="1" maxOccurs="1"/>
        </xsd:all>
    </xsd:complexType>
</xsd:element>
<xsd:element name="EventLog" type="xsd:string"/>
<xsd:element name="DataDefinition" type="xsd:string"/>
```

EventLog: This is a semicolon separated string of values containing protocol server specific information as specified in section 2.2.1.2.1.1:

Protocol Server Specific Event Log

A semicolon separated string of values specifying protocol server specific information. Using the ABNF syntax, as specified in [RFC5234], the event log conforms to the following specification, according to embodiments:

EventLog=(Header)17*(";" Entry)(";" State)7*(";" Entry)
Header=1*CHAR
Entry=*CHAR
State=*CHAR DataDefinition: The string indicating the signed data block of the form file being signed, as specified in [MS-IPFF] section 2.2.15 and [MS-IPFF2] section 2.2.1.1.15:

xdSignedDataBlockName

This simple type specifies restrictions for specifying the name of a signed data block.

Referenced By signedDataBlock.xsfschema@name

The following W3C XML Schema ([XMLSCHEMA1] section 2.1) fragment specifies the contents of this simple type.

```
<xsd:simpleType name="xdSignedDataBlockName">
    <xsd:restriction base="xsd:ID">
        <xsd:minLength value="1"/>
        <xsd:maxLength value="255"/>
    </xsd:restriction>
</xsd:simpleType>
```

An example protocol client request to cancel the application of a digital signature to a form file is shown as follows, in accordance with embodiments of the present disclosure:

An example of a protocol client request to cancel the application of a digital signature to a form file, as specified in section 2.2.1.2.3, is illustrated here:

```
POST /_layouts/Signature.FormServer.aspx HTTP/1.1
    Content-Type: text/xml
    Host: contoso
<SignCancel><EventLog>1
8;5;872b5f4e78e1493582a00f161142fe62_be2940ab07fd4251bbcdf0041d2bc5da;AHLZ4GUV
VKKSISFM2IIBTIRCKQRSCL2TJFKEKUZPKY2C6RCTJFDS6RSPKJGVGL2UIVGVATCB
KRCS4WCTJYVGQOCRKNJG4STIHFLVE6BUKVTE6N2CJ54WOSZYGNLWQT3PBUUM
UBYM5GEMQSIGY3EQ4Y;0;;%2Fsites%2Fv4%2Fdsig%2Fforms%2Ftemplate.xsn;http%3A
%2F%2Fcontoso%2Fsites%2Fv4%2Fdsig%2Fforms%2Ftemplate.xsn;;http%3A%2F%2Fcontoso
%2Fsites%2Fv4;;1;1;0;1;0;0;633997851883411000;;FormControl;0;1033;1033;0;13;Op0ZEFd
M7QYQwAg6724FORnJu727/iMxjDBCQU2UHqX8B/P+trBObL+1XnQzZ/s068f9gUYZp1Yx
HRgsxi3A0w==|633997856567555876</EventLog><DataDefinition>group1</DataDefinition>
</SignCancel>
```

In turn, the following response message 912 is sent by protocol server 908 to protocol client 902 over network 906 in response to a request to initiate the signing process, in accordance with embodiments disclosed herein:

Response for Retrieve Form File Hash
ErrorCode
Specifies the result of processing a request for Retrieve Form File Hash, as specified in section 2.2.1.2.1. This value, in embodiments, is Base64 encoded, as specified in [RFC4648]. The Base64 encoded string, in embodiments, is not empty. When decoded, this value, in embodiments, is 1 to specify success. Any other decoded value indicates a failure.
ResponseData
Specifies the digest value associated with the form file after applying the processing rules specified in [XMLDSig] section 3. This string value, in embodiments, is Base64 encoded, as specified in [RFC4648] and, in embodiments, is not empty.
PageStateData
Specifies a set of properties that the protocol server uses to persist implementation specific data across protocol messages. This string value, in embodiments, is Base64 encoded, as specified in [RFC4648]. If the protocol server does not persist any properties, this value, in embodiments, is empty.

An example protocol server response message to a request to initiate the signing process is as follows, according to embodiments of the present disclosure:

An example of a protocol server response message to a request to initiate a signing process, as specified in section 2.2.2.2.1, is illustrated in this section. The string value of PageStateData, as specified in section 2.2.2.2, is empty in the message example. The required CRLF characters are present in the message example.

```
HTTP/1.1 200 OK
Cache-Control: private
Content-Type: text/html; charset=utf-8
Vary: Accept-Encoding
AQ==
RLVG1nrhjkgeTBUNEGE1/cQoMlo=
```

PageStateData
Specifies a set of properties that the protocol server uses to persist implementation specific data across protocol messages. This string value, in embodiments, is Base64 encoded, as specified in [RFC4648]. If the protocol server does not persist any properties, this value, in embodiments, is empty.

In further embodiments, the following response message is sent from protocol server 908 to protocol client 902 over network 906 for responding to a request for Add Signature Value and Context for completing the signing process.
Response for Add Signature Value and Context
ErrorCode
Specifies the result of processing a request for Add Signature Value and Context, as specified in section 2.2.1.2.2. The string value, in embodiments, is Base64 encoded, as specified in [RFC4648]. The Base64 encoded string, in embodiments, is not empty. When decoded, this value, in embodiments, is 1 specify success. Any other decoded value indicates a failure.
ResponseData
This string value, in embodiments, is an empty string.
PageStateData
As specified in section 2.2.2.2.1.3:
PageStateData
Specifies a set of properties that the protocol server uses to persist implementation specific data across protocol messages. This string value is Base64 encoded, as specified in [RFC4648], according to embodiments. If the protocol server does not persist any properties, this value is empty, according to embodiments.

An example protocol server response to add a signature value and context to a form file is shown as follows, in accordance with embodiments disclosed herein:

An example of a protocol server response to add a signature value and context to a form file, as specified in section 2.2.2.2.2, is illustrated in this section. The string values of ResponseData and PageStateData, as specified in section 2.2.2.2, are empty in the message example. The required CRLF characters are present in the message example.

```
HTTP/1.1 200 OK
Cache-Control: private
Content-Type: text/html; charset=utf-8
Vary: Accept-Encoding
Content-Length: 6
AQ==
```

PageStateData
Specifies a set of properties that the protocol server uses to persist implementation specific data across protocol messages. This string value, in embodiments, is Base64 encoded, as specified in [RFC4648]. If the protocol server does not persist any properties, this value, in embodiments, is empty.

In embodiments, the following response message is sent from protocol server 908 to protocol client 902 over network 906 for responding to a request to cancel the application of a digital signature to a form file.
Response for Cancel Digital Signature
ErrorCode
Specifies the result of processing a request for Cancel Digital Signature, as specified in section 2.2.1.2.3. The string value, in embodiments, is Base64 encoded, as specified in [RFC4648]. The Base64 encoded string, in embodiments, is not empty. When decoded, this value, in embodiments is 1 to specify success. Any other decoded value indicates a failure.
ResponseData
This string value, in embodiments, comprises an empty string.
PageStateData
As specified in section 2.2.2.2.1.3:
PageStateData
Specifies a set of properties that the protocol server uses to persist implementation specific data across protocol messages. This string value, in embodiments, is Base64 encoded, as specified in [RFC4648]. If the protocol server does not persist any properties, this value, in embodiments, is empty.

An example protocol server response to cancel the application of a digital signature to a form file is shown as follows, in accordance with embodiments of the present disclosure:

An example of a protocol server response to cancel the application of a digital signature to a form file, as specified in section 2.2.2.2.3, is illustrated in this section. The string values of ResponseData and PageStateData, as specified in section 2.2.2.2, are empty in the message example. The required CRLF characters are present in the message example.

```
HTTP/1.1 200 OK
Cache-Control: private
Content-Type: text/html; charset=utf-8
Vary: Accept-Encoding
Content-Length: 6
Ag==
```

PageStateData

Specifies a set of properties that the protocol server uses to persist implementation specific data across protocol messages. This string value, in embodiments, is Base64 encoded, as specified in [RFC4648]. If the protocol server does not persist any properties, this value, in embodiments, is empty.

The example software functional modules 900 are offered as an example of possible software functional modules for the embodiments described. Other embodiments may include the modules depicted, fewer than the modules and/or sub-modules depicted, additional modules and/or sub-modules, combinations of modules and/or sub-modules, expansions of the modules and/or sub-modules depicted, etc. Further, the message requests and responses may be referred to with different names in other embodiments without departing from the spirit and scope of the present disclosure.

Figure 10:
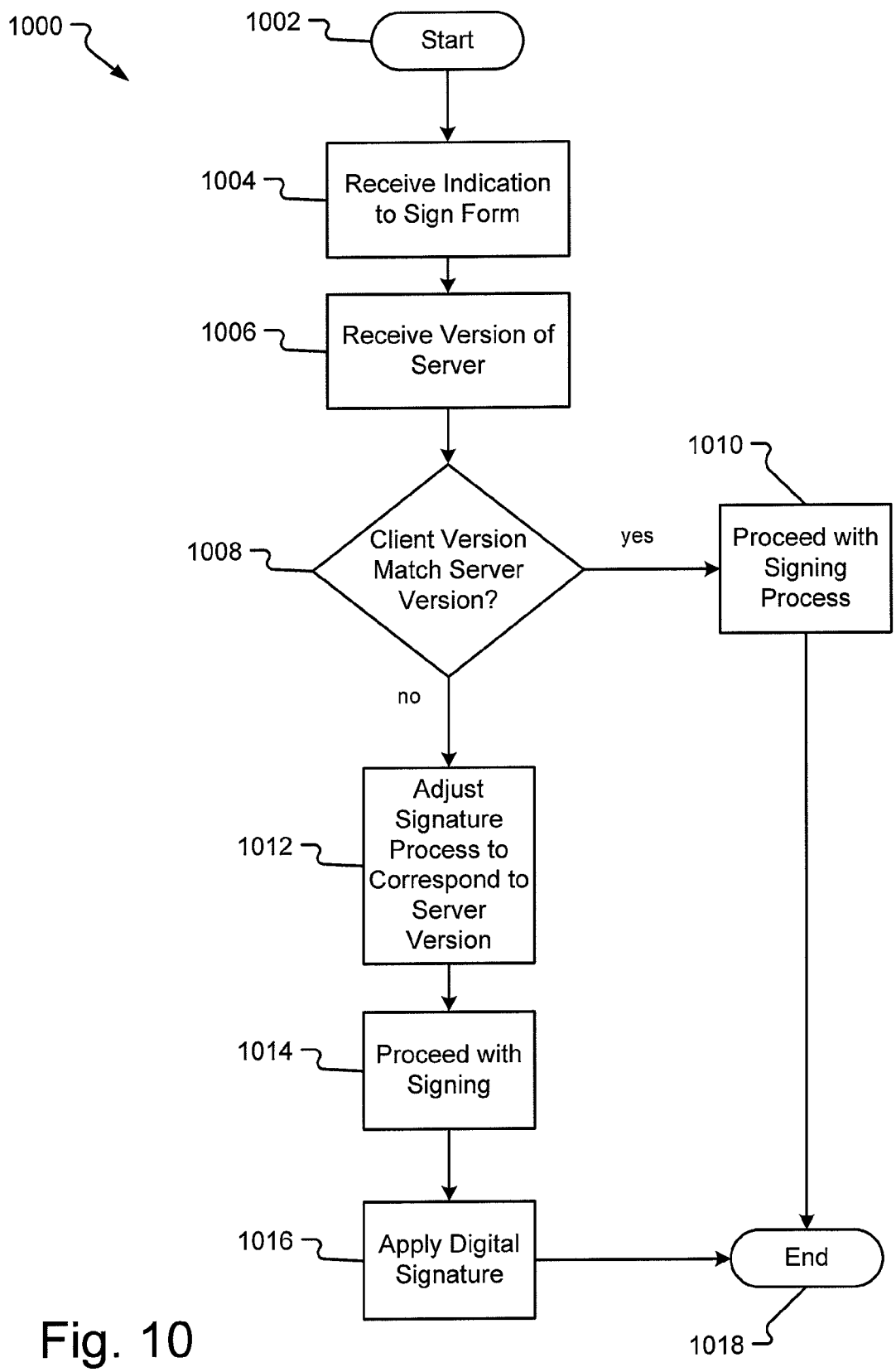
FIG. 10 illustrates a flow diagram depicting the operational characteristics of a process for reconciling different versions of a form file application in accordance with embodiments of the present disclosure.

While FIG. 9 illustrates a logical representation showing the interactions of a protocol client and a protocol server during a signing session, FIG. 10 depicts the operational characteristics of a process 1000 for reconciling different versions of a form file application in accordance with embodiments of the present disclosure. As discussed above, a versioning mechanism allows for multiple versions of a protocol server to interoperate with the latest, or current, version of the protocol client. Consequently, the current protocol client can apply a digital signature to a document stored on previous releases of the protocol server. START operation 1002 is initiated, in which a client receives data entered into a form. Such data may be entered by a user(s) or by another computing device, for example. Next, process 1000 proceeds to receive indication to sign form 1004, in which the client receives an indication that a digital signature is to be applied to the form file associated with the particular form. The client receives from the server the version of the application implemented by the server 1006. This version may also be referred to as the release version of the protocol server. Next, the client determines whether the received version from the server matches the version under which the client is operating 1008. If the versions are identical, process 1000 proceeds YES to proceed with signing process 1010, and process 1000 eventually terminates at END operation 1018. If the versions of the client and server are not the same, such that the client is operating under MICROSOFT SHAREPOINT DIGITAL SIGNATURE CONTROL FOR FORMS SERVICES 2010 and the server is operating under MICROSOFT INFOPATH FORMS SERVICES 2007, for example, process 1000 proceeds NO to adjust signature process to correspond to server version 1012, in which the client makes any necessary adjustments to its message sequencing, message syntax and structure, elements, properties, etc. to correspond to the server version or to at least accommodate the server version differences. Following such adjustment(s), process 1000 proceeds with the signing session 1014, such as including a request from the client to the server to initiate the signing session, e.g., sending a request to Retrieve Form File Hash. In an embodiment, if the digital signing process is successful, the digital signature is applied to the associated form file 1016, and process 1000 terminates at END operation 1018. Process 1000 thus provides for upgrading the digital signature control, for example, to accommodate different and various versions of a protocol server and protocol client. FIG. 10 is an example of possible operational characteristics for reconciling different versions of a form file application in accordance with embodiments of the present disclosure. Operational steps depicted may be combined into other steps and/or rearranged. Further, fewer or additional steps may be used, for example.

Figure 11:
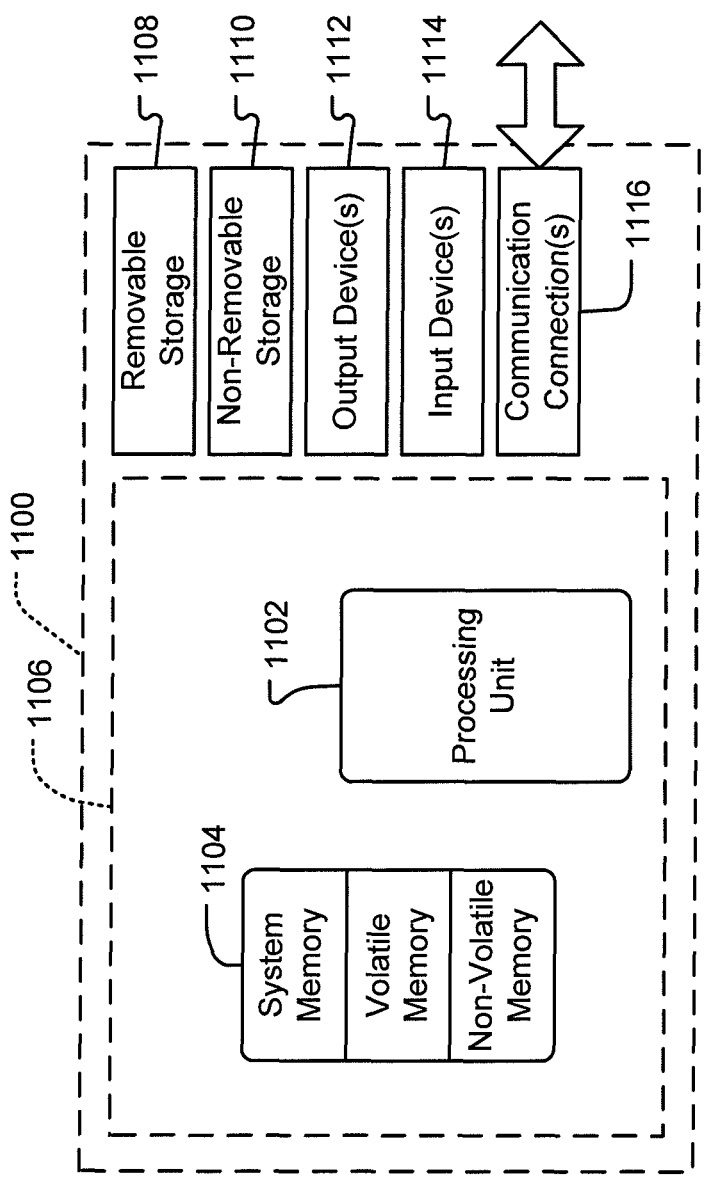
FIG. 11 depicts an example computing system upon which embodiments of the present disclosure may be implemented.

Finally, FIG. 11 illustrates an example computing system 1100 upon which embodiments disclosed herein may be implemented. A computer system 1100, such as client computer 104 or servers 108, 110, or 112 in FIG. 1, for example, which has at least one processor 1102 for exchanging form data and messages related thereto, as shown in FIG. 1, is depicted in accordance with embodiments disclosed herein. The system 1100 has a memory 1104 comprising, for example, system memory, volatile memory, and non-volatile memory. In its most basic configuration, computing system 1100 is illustrated in FIG. 11 by dashed line 1106. Additionally, system 1100 may also include additional storage (removable and/or non-removable) including, but not limited to, magnetic or optical disks or tape. Such additional storage is illustrated in FIG. 11 by removable storage 1108 and non-removable storage 1110.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1108, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. The illustration in FIG. 11 is intended in no way to limit the scope of the present disclosure.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

System 1100 may also contain communications connection(s) 1116 that allow the device to communicate with other devices. Additionally, to input content into the form fields displayed on a User Interface (UI) on client computer 104, for example, as provided by a corresponding UI module (not shown) on client computer 104, for example, in accordance with an example embodiment of the present disclosure, system 1100 may have input device(s) 1114 such as a keyboard, mouse, pen, voice input device, touch input device, etc. Output device(s) 1112 such as a display, speakers, printer, etc. may also be included. All of these devices are well known in the art and need not be discussed at length here. The aforementioned devices are examples and others may be used.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, and/or media described herein. Rather, the specific structures, features, acts, and/or media described above are disclosed as example forms of implementing the claims. Aspects of embodiments allow for multiple client computers, multiple servers, and multiple networks, etc. Or, in other embodiments, a single client computer with a single server and single network are used. One skilled in the art will recognize other embodiments or improvements that are within the scope and spirit of the present disclosure. Therefore, the specific structure, acts, and/or media are disclosed as example embodiments of implementing the present disclosure. The disclosure is defined by the appended claims.

What is claimed is:

1. A computer-implemented method for cancelling application of a digital signature to a form file, the method comprising: requesting, using hardware processor by a protocol client, application of a digital signature to the form file associated with a form, wherein the application of a digital signature is performed using an InfoPath Digital Signing Protocol, and wherein the requesting application of a digital signature comprises a message to retrieve a form file hash, wherein the message to retrieve a form file hash is a Retrieve Form File Hash request; wherein the protocol client receives a Retrieve Form File Hash response comprising an error code value, digest value associated with the form file, and a set of properties the protocol server uses to persist data across protocol message; receiving an indication of an error in processing of the request for application of a digital signature; and after receiving the indication of the error, requesting, by the protocol client, cancellation of the application of the digital signature, wherein the requesting cancellation comprises a semicolon separated string of values comprising protocol server specific information.

2. The method of claim 1, wherein the semicolon separated string of values comprising protocol server specific information is an Event Log.

3. The method of claim 1, wherein the Retrieve Form File Hash request comprises a version of an operating system running on a client computer at a time of signing.

4. The method of claim 2, wherein the Event Log uses an Augmented Backus-Naur Form (ABNF) syntax.

5. The method of claim 1, further comprising sending a request to complete the signing process.

6. The method of claim 5, wherein the request to complete the signing process comprises a request to add a signature value and context, and wherein the request to add a signature value and context comprises a string indicating a signed data block of the form file being signed.

7. The method of claim 1, further comprising:
transitioning the form file from an initial state to a pre-signed state to a signed complete state where the signing process is successful.

8. The method of claim 1, further comprising:
receiving a response message to the request for application of a digital signature to the form file; and
receiving a response message to the request to cancel application of the digital signature to the form file.

9. The method of claim 1, wherein the error is detected by a value of an error code of other than 1.

10. A system comprising:
at least one hardware processor;
memory coupled to the at least one processor, the memory comprising computer-program instructions executable by the at least one hardware processor for:
receiving, by a protocol server, a request to apply a digital signature to a form file, wherein the request is received from a protocol client, the application of the digital signature being performed using an InfoPath Digital Signing Protocol, wherein the request comprises a message to retrieve a form file hash; wherein the message to retrieve a form file hash is a Retrieve Form File Hash request; wherein the protocol client receives a Retrieve Form File Hash response comprising an error code value, digest value associated with the form file, and a set of properties the protocol server uses to persist data across protocol message;
determining whether the form file is in an initial state;
when the form file is in the initial state, processing the request; moving the form file to a pre-signed state;
receiving a request to complete the application of the digital signature to the form file;
detecting an error in processing of the request to complete the application of the digital signature to the form file; and
after detecting an error, receiving a request to cancel the application of the digital signature to the form file, wherein the request to cancel the application of the digital signature comprises a semicolon separated string of values comprising protocol server specific information.

11. The system of claim 10, wherein the form file is restored to the initial state upon successful completion of the process for cancelling the application of the digital signature to the form file.

12. The system of claim 10, wherein the semicolon separated string of values comprising server specific information is an Event Log.

13. One or more computer storage media devices, excluding signal, storing computer-executable instructions that when executed by a processor perform a method for cancelling application of a digital signature to a form file, the method comprising:
requesting, by a protocol client, application of a digital signature to the form file associated with a form, wherein the application of a digital signature is performed using an InfoPath Digital Signing Protocol, and wherein the requesting application of a digital signature comprises a message to retrieve a form file hash; wherein the message to retrieve a form file hash is a Retrieve Form File Hash request; wherein the protocol client receives a Retrieve Form File Hash response comprising an error code value, digest value associated with the form file, and a set of properties the protocol server uses to persist data across protocol message;
receiving an indication of an error in processing of the request for application of a digital signature; and
after receiving the indication of the error, requesting, by the protocol client, cancellation of the application of the digital signature, wherein the requesting cancellation comprises a semicolon separated string of values comprising protocol server specific information.

14. The one or more computer storage devices of claim 13, wherein the semicolon separated string of values comprising protocol server specific information is an Event Log.

15. The one or more computer storage devices of claim 13, wherein the protocol client receives indication of a version of a form application implemented by a protocol server.

16. The one or more computer storage devices of claim 15, further comprising:
- determining if the version of the form application implemented by the protocol server matches the version of the form application implemented by the protocol client; and
- when the versions of the protocol server and of the protocol client differ, adjusting, by the protocol client, the request for application of the digital signature to match one or more requirements of the protocol server.

* * * * *